US00RE40074E

(19) United States
(12) Reissued Patent
Butler et al.

(10) Patent Number: US RE40,074 E
(45) Date of Reissued Patent: Feb. 19, 2008

(54) REDUCED TELEVISION DISPLAY FLICKER AND PERCEIVED LINE STRUCTURE WITH LOW HORIZONTAL SCAN RATES

(75) Inventors: Donald S. Butler, Cupertino, CA (US); Xu Dong, San Jose, CA (US); Jack J. Campbell, San Francisco, CA (US)

(73) Assignee: Genesis Microchip Inc., Santa Clara, CA (US)

(21) Appl. No.: 11/188,285

(22) Filed: Jul. 21, 2005

Related U.S. Patent Documents

Reissue of:
(64) Patent No.: 6,597,402
Issued: Jul. 22, 2003
Appl. No.: 09/654,938
Filed: May 10, 2000

(51) Int. Cl.
*H04N 7/01* (2006.01)

(52) U.S. Cl. ..... 348/447; 348/443; 348/910
(58) Field of Classification Search ..... 348/447, 348/443, 910, 458, 459, 441, 448, 452, 581
See application file for complete search history.

(56) References Cited

U.S. PATENT DOCUMENTS 4,768,092 A 8/1988 Ishikawa
4,876,596 A 10/1989 Faroudja
4,982,280 A 1/1991 Lyon et al.
5,754,248 A * 5/1998 Faroudja ..... 348/474
5,844,619 A 12/1998 Songer
5,907,364 A 5/1999 Furuhata et al.
6,014,182 A 1/2000 Swartz
6,054,977 A 4/2000 Weston et al.

FOREIGN PATENT DOCUMENTS

EP 2070465 7/1982
EP 0654197 4/1999

* cited by examiner

*Primary Examiner*—Victor R. Kostak
(74) *Attorney, Agent, or Firm*—Beyer Weaver LLP

(57) ABSTRACT

An interlaced television signal is derived from an interlaced 625 line, nominally 50 Hz field rate television signal, the derived television signal having perceived reduced line structure and reduce flicker. The field rate and the number of lines of the derived television signal are increased with respect to the field rate and the number of lines of the original television signal, such that perceived flicker and line structure in the derived television signal is reduced. The increase in the field rate and the increase in the number of lines in the derived television signal results in a horizontal scanning rate that does not substantially exceed twice the horizontal scanning rate of the original television signal while minimizing undesirable motion artifacts.

21 Claims, 15 Drawing Sheets

REDUCED TELEVISION DISPLAY FLICKER AND PERCEIVED LINE STRUCTURE WITH LOW HORIZONTAL SCAN RATES

Matter enclosed in heavy brackets [ ] appears in the original patent but forms no part of this reissue specification; matter printed in italics indicates the additions made by reissue.

FIELD OF THE INVENTION

The present invention relates to television signal processing. More particularly, the present invention relates to improved signal processing in which both flicker and perceived line structure in the displayed television signal are reduced while minimizing undesirable motion artifacts and allowing relatively low horizontal scanning rates suitable for mass market television displays.

BACKGROUND OF THE INVENTION

The 50 Hz, 625 line PAL and SECAM television systems were developed some forty years ago. Those systems have a 50 Hz field rate (312.5 lines per interlaced field) and a 25 Hz frame rate (625 interlaced lines per frame, only 576 of which are visible). At the time of their development, technology did not support large display sizes. Consequently, 576 lines per frame were adequate to render the line structure unnoticeable at normal viewing distances. Also, at that time, display brightness was much lower than in typical displays of the present era. As a result, flicker resulting from the relatively low 50 Hz field rate (refresh rate) was not a serious problem. When PAL and SECAM signals are displayed on today's large screen television equipment, both flicker and line structure are visible and annoying to most viewers.

The problem of flicker is particularly objectionable in 50 Hz systems displayed on large bright screens. To overcome flicker, video systems have been produced that double the frame rate. However, frame doubling still leaves the line structure visible in large displays. Visible line structure is reduced by line doubling. One type of line doubling converts the interlaced signal to a progressively scanned one in which the progressively scanned frame rate is the same as the interlaced field rate and the progressive frames have twice as many lines as an interlaced field. Another type of line doubling maintains interlacing but doubles the number of lines in each interlaced field.

Some "high end" television display enhancement products include both line doubling and frame doubling, including products manufactured by Faroudja Laboratories, Inc. of Sunnyvale, Calif. While providing an excellent picture display without flicker and visible line structure at normal viewing distances, such systems require a high horizontal scan rate. The Faroudja Laboratories product that provides a line doubled and frame doubled progressively scanned output requires a 63 kHz horizontal scan rate, a rate well above the performance capability of all by the best quality and most expensive display systems marketed in relatively small quantities. For the general market, television set manufacturers would like for horizontal scan rates to be below 40 kHz and preferably around 31 kHz for low cost display manufacturing. Thus, a line doubled and frame doubled combination would not be viable in mass market consumer applications. It would be desirable to reduce flicker and perceived line structure, while not requiring an increase in the horizontal scan rate above that supportable by mass market horizontal scanning systems.

SUMMARY OF THE INVENTION

In accordance with the teachings of the present invention, a method is provided for deriving an interlaced television signal from an interlaced 625 line, nominally 50 Hz field rate television signal, such as PAL or SECAM television signal, the derived television signal having perceived reduced line structure and perceived reduced flicker, in which, in either order: (1) the field rate of the derived television signal is increased with respect to the field rate of the original television signal, such that the increase in field rate reduces perceived flicker in the derived television signal, and (2) the number of lines in each field of the derived television signal with respect to the number of lines in each field of the original television signal is increased, such that the increase in lines reduces perceived line structure in the derived television signal, wherein the increase in the field rate and the increase in the number of lines in the derived television signal results in a horizontal scanning rate that does not substantially exceed twice the horizontal scanning rate of the original television signal while minimizing undesirable motion artifacts.

The invention may be implemented in one of two basic ways. In a first approach, the number of lines in each field of the derived television signal is increased prior to increasing the field rate of the derived television signal. The number of lines in each field of the derived television signal are increased by de-interlacing the original television signal to produce a progressively scanned signal and then increasing the number of lines in each frame of the progressively scanned television signal. Alternatively and less desirably, the number of lines in the original interlaced signal may be increased followed by conversion of the line increased interlaced signal to a progressively scanned format. Then the field rate of the derived television signal is increased by reinterlacing the progressively scanned television signal such that for some progressively scanned frames a pair of interlaced fields are derived and for selected progressively scanned frames only one interlaced field is derived, thus dropping selected ones of the potential interlaced fields in order to compensate for the increased number of lines. Consequently, the required horizontal scanning rate remains relatively unchanged or is not substantially increased from the horizontal scanning rate required for a signal that is only line doubled or only frame doubled. The resulting line increased and frame increased signal is thus supported by low cost horizontal scanning systems.

In the second approach, the field rate of the derived television signal is increased prior to increasing the number of lines in each field of the derived television signal. This approach has the advantage of requiring fewer memory resources, thus reducing the cost of a practical implementation. This approach also readily lends itself to implementation in a practical implementation that is also operable to provide either line doubling by itself or frame doubling by itself. The field rate of the derived television signal is increased by deriving two or three signal streams from the original television signal. Each of the signal streams comprises a pattern of n repeated time-compressed fields (where "n" is a whole positive integer), each of said signal streams having a field rate substantially equal to the increased field rate, all of fields in a signal stream being of the same parity, at least one signal stream consisting of even parity fields, each field in a signal stream being substantially identical in information content to each consecutive field of the same parity in the original television signal. Two further signal streams are derived from the initial two or three signal streams by alternately selecting even and odd fields from the two or three signal streams for the first further signal stream, and by alternately selecting, from the two or three signal streams, a field of opposite parity to the field selected for the second further signal stream. Selected scan lines from the second further signal stream are added to the scan lines in the first further signal stream in order to increase the number of lines in the derived television signal.

INCORPORATION BY REFERENCE

Each of the following United States Patents, mentioned in the present application, are hereby incorporated by reference in their entirety: 4,876,596; 4,967,271; 4,982,280; 4,989,090; 5,159,451; 5,291,280; 5,940,141; and 6,014,182. In addition, allowed U.S. application Ser. No. 08/953,840, filed Oct. 14, 1997, is also incorporated by reference in its entirety.

DETAILED DESCRIPTION OF THE PREFERRED EMBODIMENTS

Except as noted herein, practical embodiments of the invention may be implemented using analog, digital (including digital signal processing with software), or hybrid analog/digital techniques. The equivalency of analog and digital implementations in most contexts is well known to those of ordinary skill in the art.

Throughout this document, for simplicity, signal inputs and outputs are drawn as single points and signal carrying lines are drawn as single lines. It will be understood that, in practice, more than one input or output point and more than one signal carrying line may be required, depending on the format of the signals and the manner in which the practical embodiments of the invention are physically constructed.

It should also be understood that functions shown separately may be combined with others in whole or in part. In addition, those of ordinary skill in the art will understand that, in practice, switches shown schematically throughout the various figures will be implemented electronically or in software rather than mechanically.

Figure 1:
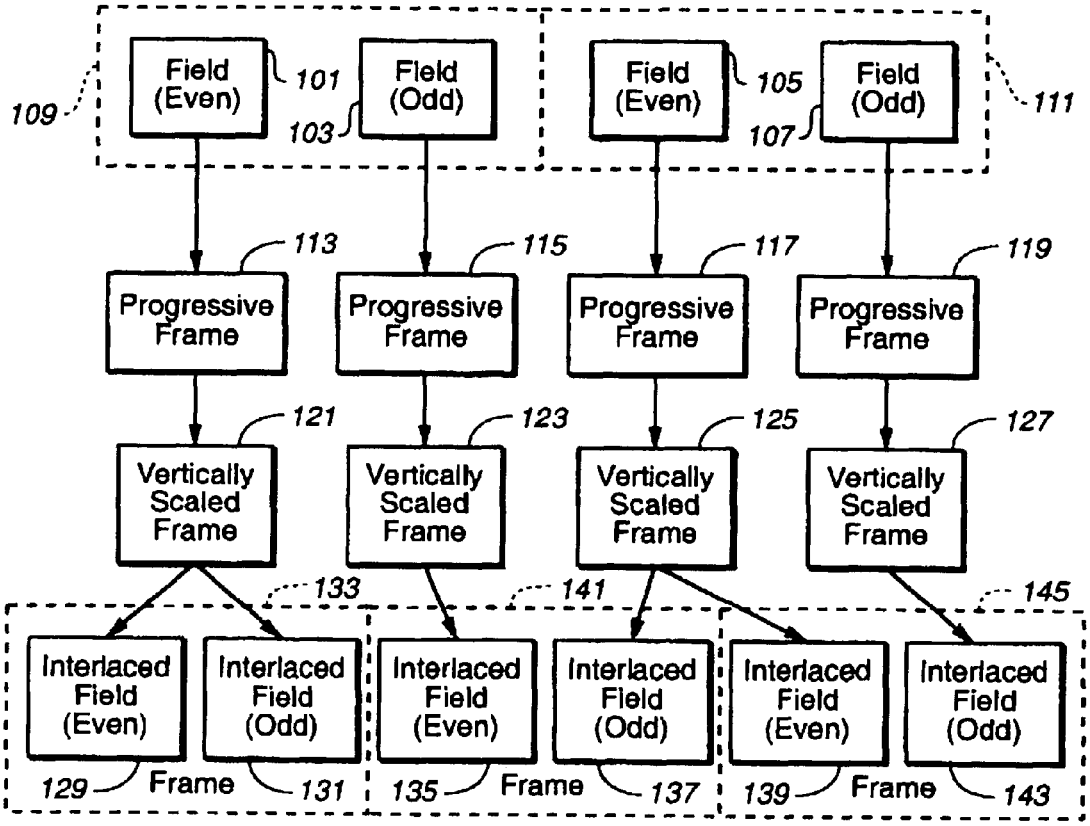
FIG. 1 shows a functional and schematic flow diagram illustrating a process for converting a standard nominally 50 Hz, 625 line interlaced television signal, such as a PAL or SECAM signal, to an interlaced television signal having a nominally 75 Hz field rate and an increased number of lines.

FIG. 1 shows a functional and schematic flow diagram illustrating a process for converting a standard nominally 50 Hz, 625 line interlaced television signal, such as a PAL or SECAM signal, to an interlaced television signal having a nominally 75 Hz field rate and increased number of lines. Four fields (101, 103, 105 and 107) of the 50 Hz video input are shown. This sequence and the sequences derived from it repeat. Even parity field 101 and odd parity field 103 are shown in a first frame 109, while even parity field 105 and odd parity field 107 are shown in a second frame 111. The video input frame periods are 40 ms (milliseconds) each; two frames occur in 80 ms.

Each interlaced field is converted to a progressive frame, creating progressive frames 113, 115, 117 and 119, respectively. The progressive frame rate is the same as the interlaced field rate. Each progressive frame has twice the number of lines as the interlaced field from which it is derived. Thus, each progressive frame has 625 lines versus 312.5 lines in the field from which it is derived. Such a process is often referred to as "line doubling." The horizontal scan rate required for displaying such a video signal is about 31 kHz, about double that required for displaying a 50 Hz, 625 line interlaced signal. Techniques for interlaced-to-progressive conversion type line doubling are well known in the art. In this flow diagram, one such technique is shown in which each progressive frame is derived from only a single interlaced field. In order to do so, additional lines must be generated by intrafield interpolation. Many techniques for intrafield interpolation are known in the art. A preferred technique for intrafield interpolation is disclosed in copending allowed U.S. application Ser. No. 08/953,840, filed Oct. 14, 1997, entitled "Adaptive Diagonal Interpolation for Image Resolution Enhancement" by Jack J. Campbell, published Apr. 22, 1999 as International Publication Number WO 99/19834.

Next, each progressive frame is vertically scaled to increase its number of lines from 625 lines to a higher number sufficient to minimize or eliminate visible line structure. A preferred increase is to an odd number of lines in the range of 821 to 839 lines, particularly 825 lines. An increase to 825 lines results in a ⅓ increase in pixels to ⅔ the number of pixels over the four progressive frames 121, 123, 125 and 127, which can be compensated for by a ¼ decrease in pixels to ¾ the number of pixels in the 75 Hz output signal as explained below (i.e., $\frac{4}{3}\times\frac{3}{4}=1$). An increase in 625 lines by ⅔ would result in 833⅓ lines. While an odd number of lines is required, a fractional number is not allowed. Inasmuch as a phase-locked loop (PLL) with a frequency lock of 99/100 is practical, 825 is a preferred number of lines (i.e., $\frac{99}{100}\times 833\frac{1}{3}=825$). Techniques for vertically scaling to increase the number of lines in a video signal are well known in the art.

As a final step, each line-increased progressive frame is converted to one or two interlaced fields, the resulting stream of fields having a nominally 75 Hz field rate. Such a rate is sufficient to avoid viewer perceived flicker. Techniques for converting progressively scanned video frames to interlaced fields are well known in the art. However, according to the present invention, when deriving a 75 Hz line interlaced video signal, instead of deriving two interlaced fields from every progressive frame, only one field is derived from every other progressive frame, resulting in the effective "dropping" of every fourth 75 Hz field. Six output fields (three frames) occur in an 80 ms period compared to four input fields (two frames). Thus, although the field rate is increased from nominally 50 Hz to nominally 75 Hz, the number of pixels in the six interlaced output fields is reduced to ¾ of the pixels present in the four progressive frames 121, 123, 125 and 127 from which the interlaced fields are derived. Consequently, the increase in pixels resulting from the increase in lines is compensated by the field dropping, resulting in substantially the same number of pixels in the output signal as in the "line doubled" progressive frames (113, 115, 117, 119). Thus, the horizontal line rate required to display the output 75 Hz line increased interlaced video is about 31 kHz, the same as that require to display the 50 Hz progressively scanned frames (113, 115, 117, 119). As discussed above, television set manufacturers prefer horizontal scan rates below 40 kHz and, preferably, around 31 kHz for low cost display manufacturing.

In the final step, even and odd interlaced fields 129 and 131 are derived from progressive frame 121. Fields 129 and 131 constitute a first output frame 133. Only even field 135 is derived from the next progressive frame 123. Odd field 137 and even field 139 are derived from the next progressive frame 125. Even field 135 and odd field 137 form a second output frame 141. Only odd field 143 is derived from progressive frame 127. Even field 139 and odd field 143 make up the third output frame 145.

Thus, no odd field is derived from progressive frame 123 and no even field is derived from progressive field 127: the odd field from the second progressive frame 123 is dropped and the even field from the fourth progressive frame 127 is dropped. By selecting this pattern of field dropping, motion artifacts in displays of the output video are minimized. All of the original fields from the 50 Hz 625 line video source are represented in the output.

The 2-1 field pattern (two fields derived from an original field followed by one field derived from an original field) results in a slight time compression of the display time of some original field information and a slight time expansion of the display time of other original field information, causing slight "judder" (i.e., jumps in displayed motion) for certain picture motion conditions, but this is more psychovisually pleasing than missing information would be. The field dropping and consequent repeating time compression and expansion pattern, however, reduces the pixel content of the output video, allowing the output video to have both an increased frame rate (to suppress flicker) and an increased line rate (to suppress visible line structure) without increasing the required horizontal scan rate.

Figure 2:
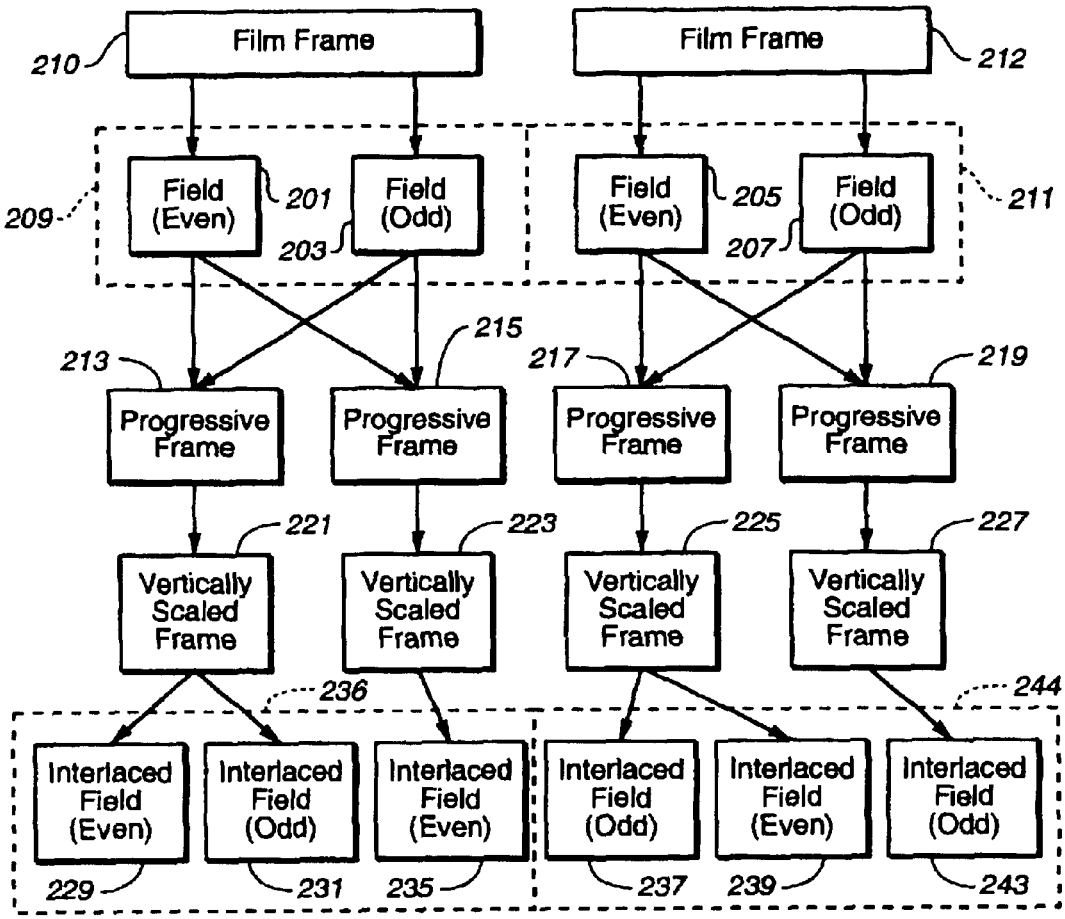
FIG. 2 shows a functional and schematic flow diagram illustrating a process for converting a standard nominally 50 Hz, 625 line interlaced television signal, such as a PAL or SECAM signal derived from a motion picture film source, to an interlaced television signal having a 75 Hz field rate and an increased number of lines.

When the video source is derived from a motion picture film, it is possible to apply the principles of the present invention so as to provide a nominally 75 Hz, increased line output video signal having no motion artifacts. FIG. 2 shows a functional and schematic flow diagram illustrating a process for converting a standard nominally 50 Hz, 625 line interlaced television signal, such as PAL or SECAM signal derived from a motion picture film source, to an interlaced television signal having a 75 Hz field rate and an increased number of lines. Throughout this document "motion picture film source" refers not only to a 24 Hz motion picture film having its frame rate increased to 25 Hz for a 2-2 pulldown synchronization with 50 Hz field rate, 25 Hz frame rate television systems, but also to other 25 Hz frame rate sources such as 25 Hz progressively scanned source or a 25 Hz computer-generated source.

Referring to FIG. 2, four fields (201, 203, 205 and 207) of the 50 Hz video input are shown. This sequence and the sequences derived from it repeat. Even parity field 201 and odd parity field 203 are shown in a first frame 209, while even parity field 205 and odd parity field 207 are shown in a second frame 211. The video input frame periods are 40 ms (milliseconds) each; two frames occur in 80 ms. Fields 201 and 203 in the first video frame 209 are derived from the same film frame 210, while fields 205 and 207 in the second film frame 211 are derived from the same next film frame 212.

Each interlaced field is converted to a progressive frame, creating progressive frames 213, 215, 217 and 219, respectively. The progressive frame rate is the same as the interlaced field rate. Each progressive frame has twice the number of lines as the interlaced field from which it is derived. Thus, each progressive frame has 625 lines versus 312.5 lines in the field from which it is derived. As noted above, such a process is often referred to as "line doubling." The horizontal scan rate required for displaying such a video signal is about 31 kHz, about double that required for displaying a 50 Hz, 625 line interlaced signal. In this flow diagram, a line doubling technique is shown in which each progressive frame is derived from two interlaced fields, the fields derived from the same motion picture film frame. Thus, fields 201 and 203 are merged to generate progressive frames 213 and 215, while fields 205 and 207 are merged to generate progressive frames 217 and 219. Alternatively and less desirably, intrafield interpolation could be employed to derive each progressive frame from a single interlaced field, in the manner of the FIG. 1 process.

Next, as in the FIG. 1 process, each progressive frame is vertically scaled to increase its number of lines from 625 lines to a higher number sufficient to minimize or eliminate visible line structure. A preferred increase for the FIG. 2 process is also to an odd number of lines in the range of 821 to 839 lines, particularly 825 lines. This increase in lines results in a ⅔ increase in pixels over the four progressive frames 221, 223, 225 and 227, which is compensated by a ¾ decrease in pixels in the 75 Hz output signal, as explained above, thus providing a system in which the horizontal scan rate in a display device is substantially 31 kHz, the same as that required for a line doubled 50 Hz video signal.

As a final step as in the FIG. 2 process, each line-increased progressive frame is converted to one or two interlaced fields, the resulting fields having a nominally 75 Hz field rate. Such a rate is sufficient to avoid viewer perceived flicker. According to the present invention, when deriving a 75 Hz line increased video signal, instead of deriving two interlaced fields from every progressive frame, only one field is derived from every other progressive frame, resulting in the effective "dropping" of every fourth 75 Hz field. Six output fields (three video frames) occur in the 80 ms period in which four input fields (two frames) occur. Thus, although the field rate is increased from nominally 50 Hz to nominally 75 Hz, the number of pixels over the six output fields is reduced to ¾ of the pixels present in the four progressive frames 221, 223, 225 and 227 from which the interlaced fields are derived. Consequently, the increase in pixels resulting from the increase in lines is compensated by the field dropping, resulting in substantially the same number of pixels in the output signal as in the "line doubled" progressive frames (213, 215, 217, 219). Thus, the horizontal line rate required to display the output 75 Hz line increased interlaced video is about 31 kHz, the same as that require to display the 50 Hz progressively scanned frames (213, 215, 217, 219).

In the final step, even and odd interlaced fields 229 and 231 are derived from progressive frame 221. Only even field 235 is derived from the next progressive frame 223. Fields 229, 231 and 235 are ultimately derived from the same motion picture film frame 210 and are shown grouped together in block 236. Odd field 237 and even field 239 are derived from the next progressive frame 225. Only odd field 243 is derived from progressive frame 227. Fields 237, 239 and 243 are ultimately derived from the same motion picture film frame 212 and are shown grouped together in block 244. Thus, the film pattern is retained with each film frame being displayed for the same time period as in the original video signal (i.e., two film frames in 80 ms—four fields in the 50 Hz input video signal and six fields in the 75 Hz output video signal). Consequently, there is no motion discontinuity for a film source. The dropping of the odd field from the second progressive frame 223 and the even field from the fourth progressive frame 227 causes no motion artifacts in displays of the output video because each contiguous group of three fields is derived from the same motion picture frame. Thus, the FIG. 2 process also reduces the pixel content of the output video, allowing the output video to have both an increased frame rate (to suppress flicker) and an increased line rate (to suppress visible line structure) without increasing the required horizontal scan rate.

Figure 3:
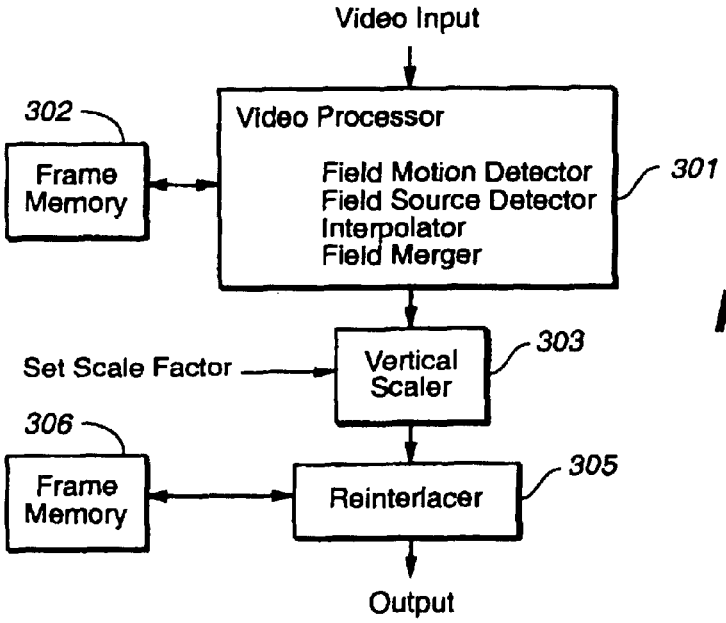
FIG. 3 shows a functional block diagram of an arrangement for practicing the processes of FIG. 1 and FIG. 2.

FIG. 3 shows a functional block diagram of an arrangement for practicing the processes of FIG. 1 and FIG. 2. A standard nominally 50 Hz, 625 line interlaced television signal, such as a PAL or SECAM signal, is applied to a video processor 301. The video processor 301 includes a frame-based motion detector, a film source detector, an intrafield interpolator, and a de-interlacer (interlace to progressive scan converter). The video processor has an associated frame memory 302 that has the capacity to store two fields (typically implemented as a delay of an even number of lines and a delay of an odd number of lines, one being 312 lines and the other 313 lines in the case of a 50 Hz system having 625 lines). The video processor 301 operates either in a standard video mode or a film mode depending on whether it detects that the input video signal is from a motion picture film source.

Figure 4:
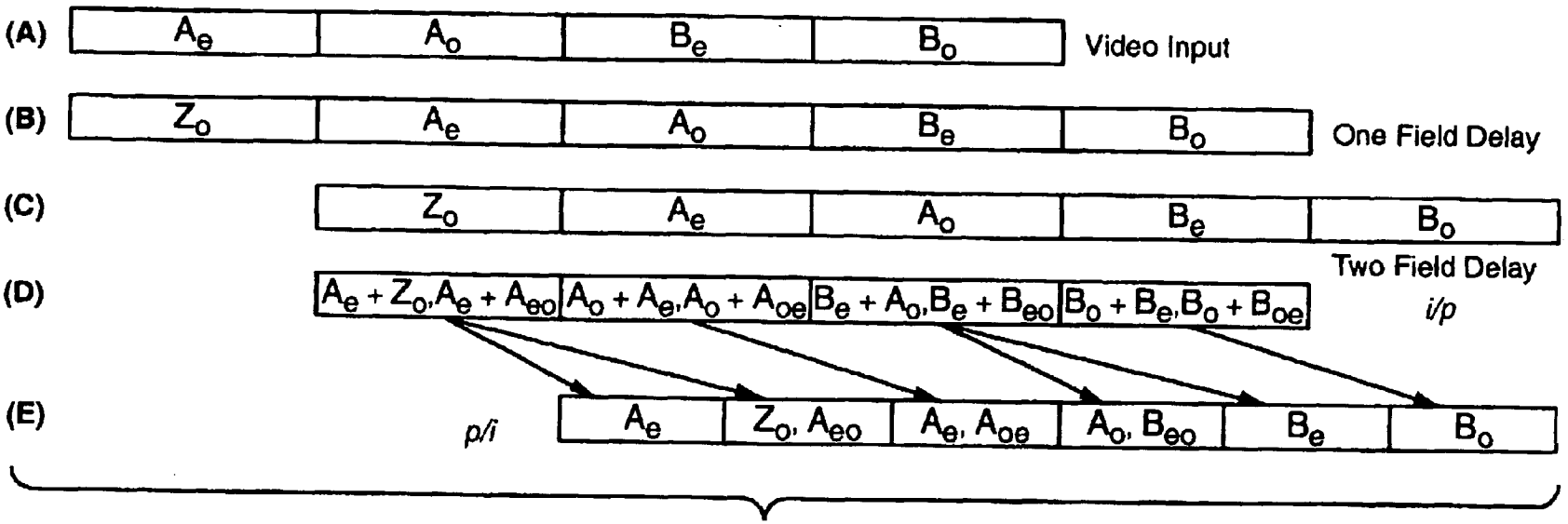
FIG. 4 shows idealized timing diagrams relating to the video mode of the arrangement of FIG. 3.

FIG. 4 shows idealized timing diagrams relating to the video mode of the arrangement of FIG. 3. The input video stream, FIG. 4A, is a conventional interlaced television signal in which Ae, Ao, Be, Bo, etc. represent consecutive alternating even and odd fields at a nominally 50 Hz field rate. A one field delayed signal stream derived by the frame memory 302 associated with the video processor 301 is shown in FIG. 4B. The odd field prior to field Ae is labeled Zo in FIG. 4B. A two field delayed signal stream derived by the frame memory 302 is shown in FIG. 4C. FIG. 4D shows the progressively scanned output of video processor 301. When the frame-based motion detector in video processor 301 detects no motion, the progressively scanned frames may consist of a merging of the input field and the one field delayed version of the input field. These are shown as Ao+Ae, Be+Ao, etc., where Ao, Ae, etc. are the original video fields. In the case of full motion (substantially all of the pixels are changed from field to field) or, alternatively, also in the case of no motion (as described in connection with the process of FIG. 1), one field in each pair may be generated by intrafield interpolation. Thus, the progressively scanned frames consist of a merging of an original field and an interpolated version of itself. These are shown as Ao+Aoe, Be+Beo, etc., where Aoe is the intrafield interpolation of Ao, etc. In the case of a field with mixed motion (only pixels in one or more definable areas of the field, less than the entire field, are different), the output of the video processor 301 will vary between the no motion output and the full motion output within the field (except for the alternative in which intrafield interpolation is provided at all times whether or not there is motion). FIG. 4D also shows the progressively scanned output of the vertical scaler 303. For simplicity in presentation, the timing figures in FIG. 4 and in other figures do not take into account the slight time delay required by intrafield interpolation and other processing. FIG. 4E shows the re-interlaced signal. For no motion, the resulting sequence is Ae, Zo, Ae, Ao, Be, Bo, etc. For full motion, the resulting sequence is Ae, Aeo, Aoe, Beo, Be, Bo, etc.

Figure 5:
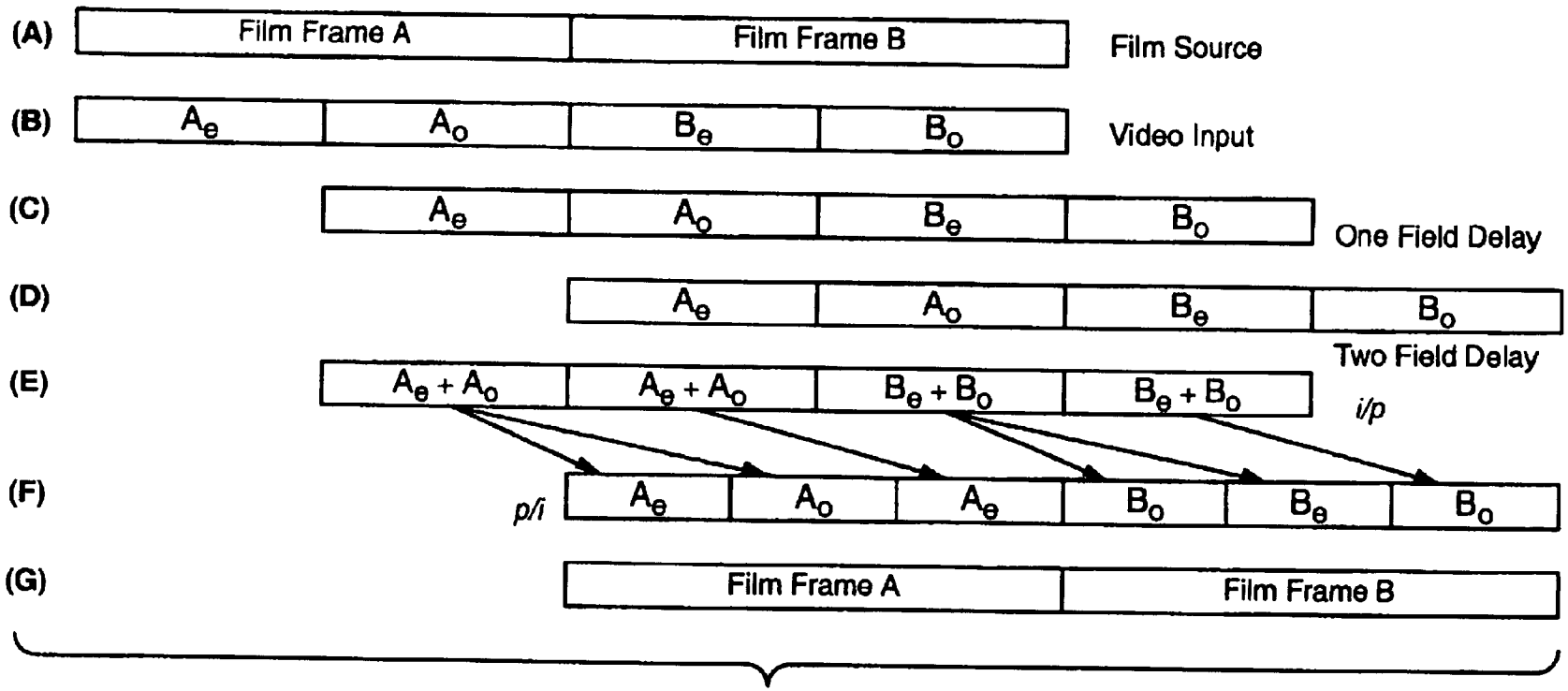
FIG. 5 shows idealized timing diagrams relating to the film mode of the arrangement of FIG. 3.

FIG. 5 shows idealized timing diagrams relating to the film mode of the arrangement of FIG. 3. FIG. 5A shows two frames of the film source. As indicated, the film frames and video signal are aligned such that fields Ae and Ao carry film frame A, etc. The input video stream FIG. 5B, which is the same as in FIG. 4A, is a conventional interlaced television signal in which Ae, Ao, Be, Bo, etc. represent consecutive alternating even and odd fields at a nominally 50 Hz field rate. A signal stream derived by a one field memory within the video processor 301 is shown in FIG. 5C. A signal stream derived by a second field memory (receiving the output of the first field memory) within the video processor 301 is shown in FIG. 5D. FIG. 5E shows the progressively scanned output of video processor 301. When the film source detector in video processor 301 detects a film source, the detector identifies the fields carrying the same motion picture frame information during each film period. Those fields, Ae and Ao, Be and Bo, etc. in this case, are merged as shown in FIG. 5E. No motion interpolation is required. FIG. 5E also shows the progressively scanned output of the vertical scaler 303.

Referring again to FIG. 3, the frame-based motion detector in video processor 301 is preferably of the type described in U.S. Pat. No. 6,014,182, which motion detector provides improved differentiation of motion and subcarrier signal components. Alternatively, other types of frame-based motion detectors may be employed, including, for example, those described in U.S. Pat. Nos. 4,982,280, 4,967,271, and 5,291,280. As is well known, frame-based motion detectors compare corresponding pixels in successive fields spaced apart by one frame. The frame motion signal indicates whether interpolation is required.

A film source detector in video processor 301 of the type responsive to a 25 Hz frame rate film source in a 50 Hz video signal may be of the type described in said U.S. Pat. No. 6,014,182 and European Patent EP 0 654 197 B1. By detecting that a 50 Hz television signal source is a motion picture film, it is then known that the two fields of each television frame are identical in the temporal domain, as they are generated from a single film frame. Thus, in a 50 Hz system, it is necessary to compare adjacent video fields for motion because only adjacent video fields will always carry the same film frame and thus have no motion. Film detection requires two field delays so that a "present" or middle field may be compared to field prior to it and to the field subsequent to it.

Intrafield interpolators usable in video processor 301 are well known in the art and include said preferred technique for intrafield interpolation disclosed in U.S. Pat. No. 4,989,090 and in said copending U.S. application Ser. No. 08/953,840 as published in International Publication Number WO 99/19834. As is well known, such interpolators operation in response to a motion detection signal as from a frame-based motion detector.

Line doublers usable in video processor 301 employing field merging and intrafield interpolation are well known in the art and include those disclosed in U.S. Pat. Nos. 4,876,956; 4,967,271; 4,982,280; 4,989,090; 5,159,451 and 5,291,280.

The progressively-scanned video output signals from video processor 301 are applied to a vertical scaler 303. The vertical scaler increases the number of lines in the progressively scanned video signal according to a "set scale factor" input. Vertical scalers are well known in the art and operate in the manner of a line interpolator or line duplicator. See, for example, U.S. Pat. No. 5,940,141.

The line-increased progressively scanned video signal output of vertical scaler 303 is applied to a reinterlacer (progressive-to-interlaced converter) 305. Progressive-to-interlace converters are well known in the art and require the use of frame memories. A further frame memory 306 having the capacity to store two fields is associated with reinterlacer 305. Thus, the arrangement of FIG. 3 requires substantial memory resources in both its input (in video processor 301) and its output. Reinterlacer 305 is a modification of conventional converters in that it derives only one field from every other progressive frame in accordance with the pattern set forth in the timing charts of FIG. 4D and FIG. 5F (note that the "A" fields of FIG. 5F carry film frame A, providing the same film frame time as the original film frame). In both the video and film cases, the reinterlacer causes three fields to be derived from every two progressive frames in the manner of the processes explained in connection with FIG. 1 and FIG. 2.

More particularly, referring to FIG. 4, the even interlaced field Ae (FIG. 4D) is derived from the progressive frame consisting of the merger of Ae+Zo or Ae+Aeo (FIG. 4C). The next odd interlaced field (FIG. 4D) (i.e., the odd field following the just-mentioned even field) is also derived from the same progressive frame (FIG. 4C). However, only an even field (Ae or Aoe, FIG. 4D) is derived from the next progressive frame (FIG. 4C). The next progressive frame has two interlaced fields derived from it, while the following progressive frame has only an odd interlaced field derived from it.

In FIG. 5, the even interlaced field Ae and the odd interlaced field Ao (FIG. 5F) are derived from the first progressive frame consisting of the merger of Ae+Ao (FIG. 5E). Only the even interlaced field (FIG. 5F) is derived from the second progressive frame consisting of the merger of Ae+Ao (FIG. 5E). Subsequently, odd and even fields Bo and Be (FIG. 5F) are derived from the first progressive frame consisting of the merger of Be+Bo (FIG. 5E), while only odd field Bo (FIG. 5F) is derived from the second progressive frame consisting of the merger of Be+Bo (FIG. 5E). FIG. 5G shows how the contiguous sets of three fields in the output stream (FIG. 5F) represent the film frames.

The output of reinterlacer 305 is the system output, an interlaced television signal having an increased frame rate and an increased number of lines in accordance with the present invention.

Figure 6:
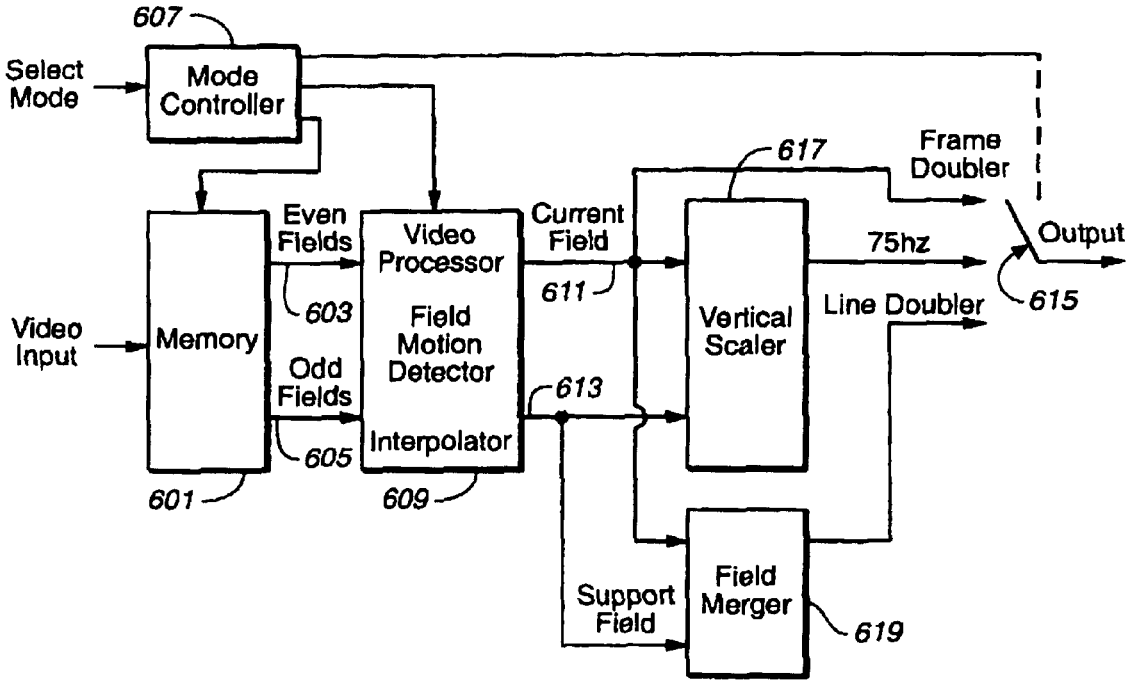
FIG. 6 shows a functional block diagram of a preferred embodiment of the invention in which fewer memory resources are required than in a first embodiment of the type shown in FIG. 1.

Referring now to FIG. 6, a preferred embodiment of the invention is shown in which fewer memory resources are required than in a first embodiment of the type shown in FIG. 3. In the FIG. 6 arrangement, field memories are required only in the input rather than in both the input and the output. Because the basic elements of this preferred embodiment are also usable for conventional line doubling and frame doubling, the preferred embodiment may be embodied in a multimode arrangement as shown in FIG. 6 and described in connection therewith. Such a multimode arrangement may be implemented, for example, as an "ASIC" (application specific integrated circuit).

The arrangement of FIG. 6 has three modes of operation when a 50 Hz interlaced video input signal (such as a conventional PAL or SECAM television signal) is applied: a conventional line doubler (providing a 50 Hz progressively scanned output with twice the number of scan lines as in the input signal), a 75 Hz interlaced output with more lines than the input signal, and a conventional frame doubler (providing a 100 Hz interlaced output with the same number of lines as in the input signal).

In FIG. 6, the video input is applied first to a memory 601 that derives a pair of signal streams 603 and 605 from the video input. Memory 601 includes a plurality of field memories and switches configured and controlled to derive signal streams having the characteristics defined herein. Memory 601 includes random access memory having the capacity to store at least three fields along with switching logic controlled by a mode control signal generated by a mode controller 607. The mode controller 607 generates a unique set of control signals in response to a choice of one of the three modes of operation at its "select mode" input. Switching logic for the field memories in memory 601 may be implemented in various ways, including, for example, hardwired logic and software controlled processors. The requirements for such logic is discernable from the timing diagrams disclosed herein and are within the ordinary skill in the art.

Signal stream 603 consists of fields of the same parity, such as all even fields. Signal stream 605 consists of fields of the opposite parity to those in stream 603, namely all odd fields if stream 603 consists of all even fields. Fields in both streams consist of the same field repeated several times, such as two, three times or four times. Each consecutive set of repeated fields in a signal stream is substantially identical in information content to each consecutive field of the same parity in the video input signal.

Figure 7:
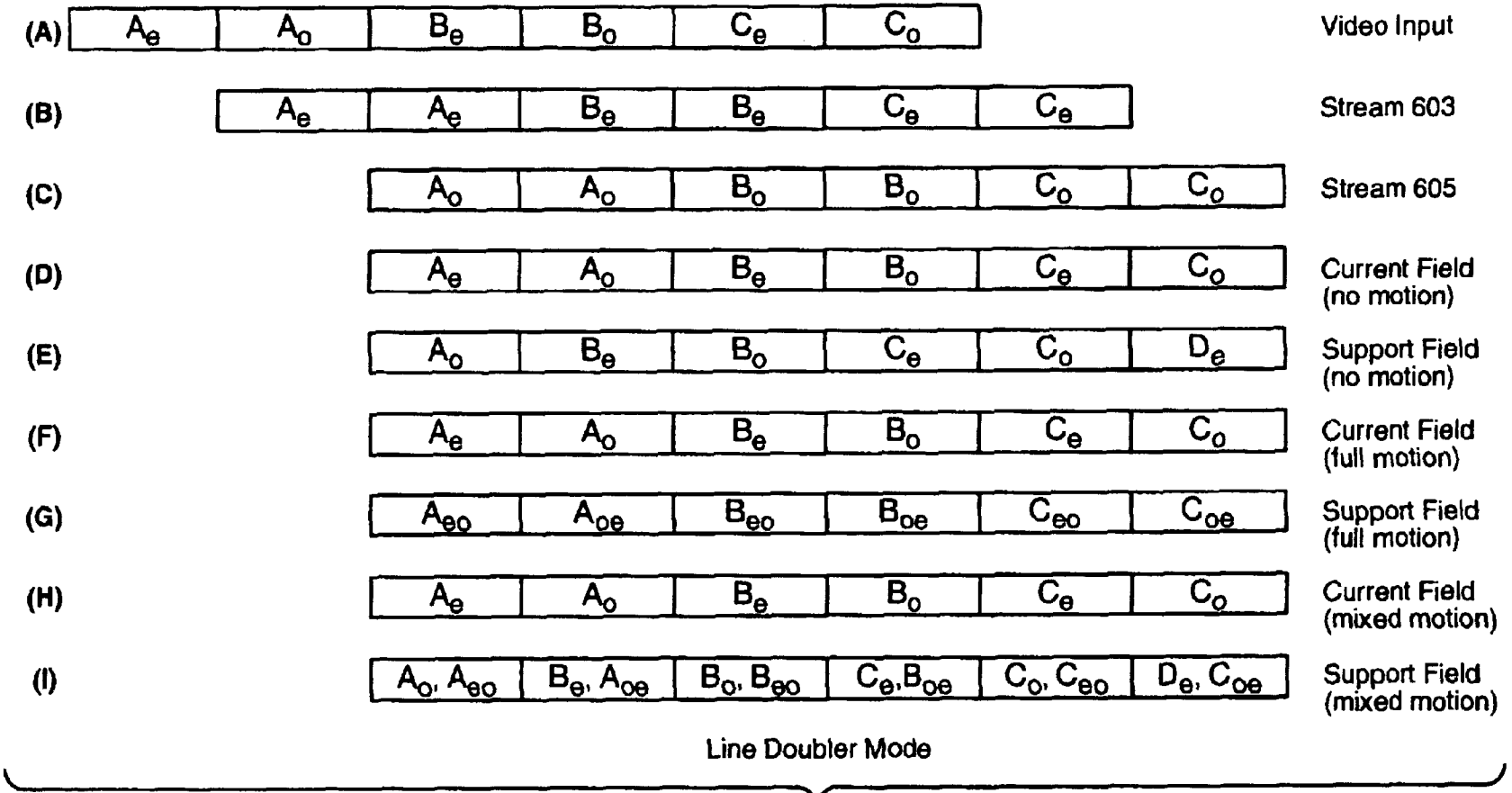
FIG. 7 shows idealized timing diagrams relating to the line doubler mode of operation of the FIG. 6 arrangement.

When the "line doubler" mode of the mode controller 607 is selected, memory 601 operates so that the signal streams 603 and 605 both have a field rate of nominally 50 Hz, the same field rate as the video input. FIG. 7 shows idealized timing diagrams relating to the line doubler mode of operation of the FIG. 6 arrangement. FIGS. 7A, 7B and 7C show the input video signal stream, the first signal stream 603 and the second signal stream 605, respectively. The input video stream, FIG. 7A, is a conventional interlaced television signal in which Ae, Ao, Be, Bo, etc. represent consecutive alternating even and odd fields at a nominally 50 Hz field rate. The signal stream 603 derived by memory 601 is shown in FIG. 7B. Each even field is repeated twice at the same field rate as the input signal. The signal stream 605 derived by memory 601 is shown in FIG. 7C. Each odd field is repeated twice at the same field rate as the input signal. The first occurring field from a particular frame is delayed by one 50 Hz field period in signal stream 605 with respect to signal stream 603.

When either the "75 Hz" mode or the "frame doubler" mode of the mode controller 607 is selected, memory 601 operates so that the signal streams 603 and 605 have increased field rates with respect to the video input, nominally 75 Hz in the "75 Hz" mode and nominally 100 Hz in the frame doubler mode. Thus, in the case of the 75 Hz and frame doubler modes, the video input fields are not only separated into even and odd streams and repeated, but are also time compressed by memory 601. This can be accomplished by reading from the memories at a faster rate than writing into them, as is well known in the art.

Figure 8:
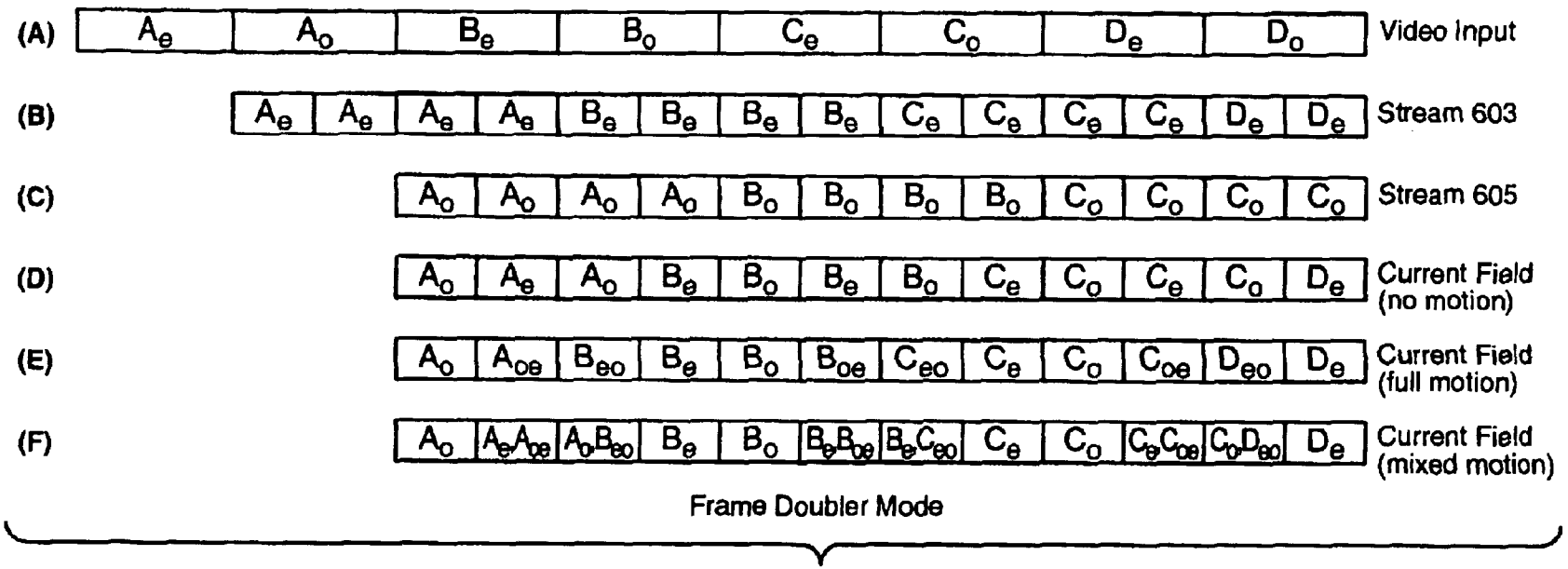
FIG. 8 shows idealized timing diagrams relating to the frame doubler mode of operation of the FIG. 6 arrangement.

FIG. 8 shows idealized timing diagrams relating to the frame doubler mode of operation of the FIG. 6 arrangement. FIGS. 8A, 8B and 8C show the input video signal stream, the first signal stream 603 and the second signal stream 605, respectively. The input video stream, FIG. 8A, is the same as FIG. 7A, namely, a conventional interlaced television signal in which Ae, Ao, Be, Bo, etc. represent consecutive alternating even and odd fields at a nominally 50 Hz field rate. The signal stream 603 derived by memory 601 in the frame doubler mode is shown in FIG. 8B. Each even field is repeated four times at twice the field rate of the input signal. The signal stream 605 derived by memory 601 in the frame doubler mode is shown in FIG. 8C. Each odd field is repeated four times at twice the field rate of the input signal. The first occurring field from a particular frame is delayed by two 100 Hz field periods in signal stream 605 with respect to signal stream 603.

Figure 9:
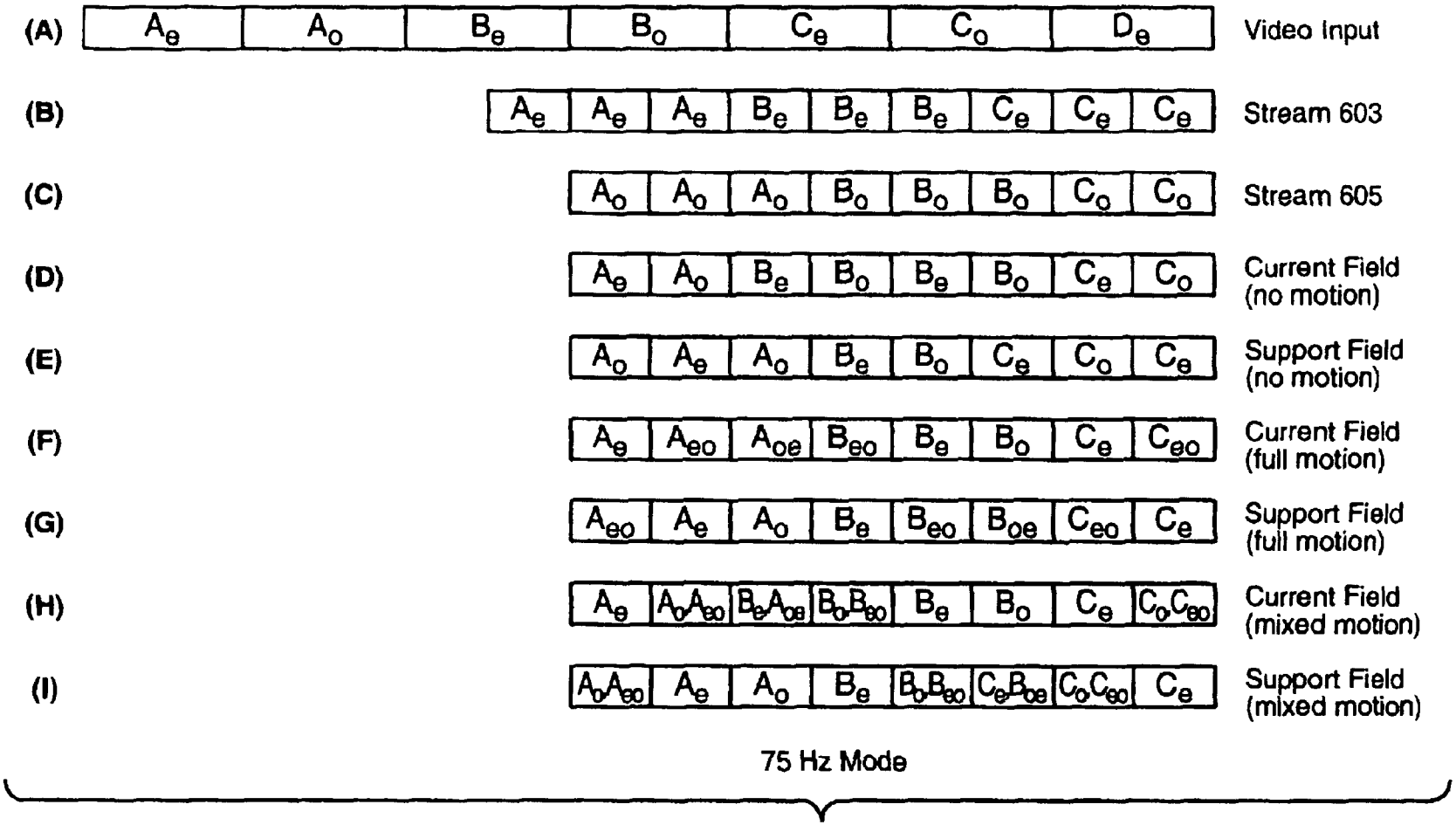
FIG. 9 shows idealized timing diagrams relating to the 75 Hz mode of operation of the FIG. 6 arrangement.

FIG. 9 shows idealized timing diagrams relating to the 75 Hz mode of operation of the FIG. 6 arrangement. FIGS. 9A, 9B and 9C show the input video signal stream, the first signal stream 603 and the second signal stream 605, respectively. The input video stream, FIG. 9A, is that same as in FIGS. 7A and 9A, namely, a conventional interlaced television signal in which Ae, Ao, Be, Bo, etc. represent consecutive alternating even and odd fields at a nominally 50 Hz field rate. The signal stream 603 derived by memory 601 in the 75 Hz mode is shown in FIG. 9B. Each even field is repeated three times at one and a half times the field rate of the input signal. The signal stream 605 derived by memory 601 in the 75 Hz mode is shown in FIG. 9C. Each odd field is repeated three times at one and a half times the field rate of the input signal. The first occurring field from a particular frame is delayed by one 75 Hz field period in signal stream 605 with respect to signal stream 603. Repetition of the fields three times at one an a half times the field rate of the input signal results in the dropping of every fourth 75 Hz field in the final output signal as in the 75 Hz mode of the FIG. 1 arrangement.

Returning to the description of FIG. 6, the signal streams 603 and 605 are applied to a video processor 609. Video processor 609 includes a field-based motion detector and an intra-field interpolator. The field-based motion detector in video processor 609 may be of the type described in U.S. Pat. No. 6,014,182. Such a detector compares temporally adjacent pixel information of opposing field parity and differentiates field-to-field motion from vertical picture transitions to provide a field motion signal. As is well known, the field motion signal indicates whether interpolation is required. Intra-field interpolators are well known in the art.

Video processor 609 also has three modes of operation. The operation of the video processor 609 depends on whether the mode controller 607 has its line doubler, 75 Hz or frame doubler mode selected by a control signal from mode controller 607. In the line doubler and 75 Hz modes of operation, the video processor 609 provides two output signal streams in response to the two input streams 603 and 605. One of its output streams 611 may be referred to as a "current field" and the other of its output streams 613 may be referred to as a "support field." Fields in the current field signal stream 611 and the support field signal stream 613 are of opposite parity during any given field time. Field periods in the streams 603 and 605 are substantially time aligned with each other. Field periods in the streams 611 and 613 are substantially time aligned with each other and with the field periods of the fields in streams 603 and 605 subject to processing delays in the video processor 609.

In the frame doubler mode of operation, if the number of lines in the output signal are not increased, only the current field signal stream 611 need be provided by the video processor 609. If it is desired to increase the number of lines in addition to frame doubling, then it is necessary to generate a support field signal stream in the frame doubler mode and to take the frame doubler output from the scaler 212 rather than directly from the video processor 609. Frame doubling with a modest increase in the number of lines may still provide a horizontal scan rate supported by inexpensive horizontal scanning circuit components.

In the frame doubler mode (when the number of lines are not increased), an output switch 615, under control of mode controller 607, selects the current field signal stream 611 as the output signal. FIG. 8 provides a further explanation of the frame doubler mode operation. FIGS. 8A, 8B and 8C have already been described above. FIG. 8D shows the current field signal stream 611 for the case when the field motion detector in the video processor 609 detects no motion. In this case, the current field signal stream 611 consists of the even and odd fields from each consecutive frame repeated twice (i.e., BeBoBeBoCeCoCeCo, etc.). As indicated in FIGS. 8B and 8C, these fields are available in the signal streams 603 and 605 received by the video processor 609. Because there is no motion from field to field, it does not matter that there is a repetition of fields from the same frame. The first occurring field from a particular frame occurs at substantially the same time in signal stream 605 and the current field signal stream, subject to processing delays in video processor 609.

FIG. 8E shows the current field signal stream 611 for the case when the field motion detector in the video processor 609 detects "full motion." In this case, some interpolated fields generated by the interpolator in the video processor 609 are used in the current field signal stream 611. Because there is motion, it is not feasible to repeat the same even and odd fields as in the no motion case (visible motion judder would result). Instead, each original field is repeated twice but in opposite parities, the parity opposite to that of the original is derived by interpolation. Thus, a suitable pattern, as shown in FIG. 8E, is BeoBeBoBoe, etc., where "Beo" is an odd parity field interpolated from the even field Be, etc. During conditions of "mixed motion", the current field signal stream will be the same as the no motion current field signal stream during portions of the field in which there is no motion and will be the same as the full motion current field signal stream during portions of the field in which there is motion. This is indicated in FIG. 8F, where, for example, "Ae,Aoe" indicates that Ae is used during no motion and that Aoe is used during motion.

In the 75 Hz mode, the output switch 615, under control of mode controller 607, selects the output of vertical scaler 617. Scaler 617 receives the current field signal stream 611 and the support field signal stream 613 and provides vertical scaling by increasing the number of lines in the television signal by a scale factor. When there is no motion in the video input signal, the current field 611 and the support field 613 are both "direct" fields derived from adjacent fields in the video input signal without interpolation of either (i.e., they have the same information content as an original input field, but they have been time compressed so that they have a nominally 75 Hz field rate). When there is motion in the video input signal, one of the fields of the current field 611 and the support field 613 is a direct field and the other is derived by interpolation from a field adjacent the direct field. The vertical scaler 617 increases the line rate of the output video signal with respect to the input video signal by adding selected lines of the support field to the current field in different ratios, depending on the scale factor.

FIG. 9 provides a further explanation of the 75 Hz mode operation. FIGS. 9A, 9B and 9C have already been described above. FIG. 9D shows the current field signal stream 611 for the case when the field motion detector in the video processor 609 detects no motion. In this case, the current field signal stream 611 consists of a pattern in which the even and odd fields from each consecutive frame occur once and then twice (i.e., AeAoBeBoBeBoCeCo, etc.). As indicated in FIGS. 9B and 9C, these fields are available in the signal streams 603 and 605 received by the video processor 609. Because there is no motion from field to field, it does not matter that there is an uneven 2-1 frame repetition pattern (i.e., two fields from one frame followed by four fields from the next frame). FIG. 9E shows the support field signal stream 613 for the no motion condition. Each field is the field in the signal stream 603 and 605 that is not selected for the current field 611 (FIG. 9D), which in each case is a field of opposite parity to that of the current field. The support field signal stream 613 also consists of a pattern in which the even and odd fields from each consecutive frame occur once and then twice. The first occurring field from a particular frame occurs at substantially the same time in signal stream 605 and the current field signal stream, subject to processing delays in video processor 609.

FIG. 9F shows the current field signal stream 611 for the case when the field motion detector in the video processor 609 detects full motion. In this 75 Hz mode, as in the frame doubler mode described above, some interpolated fields generated by the interpolator in the video processor 609 are used in the current field signal stream 611. Because there is motion, it is not feasible to use the 2-1 frame repetition pattern as in the no motion case (visible motion judder would result). Instead, the number of fields derived from each frame is equal, namely three. Within each group of three fields from the same frame there is a repeating 2-1 field pattern in which one parity of an original field is repeated twice followed by one occurrence of the field of the other parity from the same frame (i.e., AeAeAoBeBeBo, etc. or AeAoAoBeBoBo, etc). Interpolation is employed to provide the necessary sequence of even and odd parity fields while maintaining the 3-3 pattern (i.e., AeAeoAoeBeoBeBoCeCeo, etc. as shown). For more television picture conditions, the 2-1 field parity pattern within the 3-3 field pattern does not result in noticeable motion judder. The support field signal stream 613 shown in FIG. 9G is an interpolation of the field in the current field signal stream 611 (FIG. 9F) or the field from which the field in the current field signal stream 611 was interpolated. During conditions of mixed motion, the current field signal stream 611 will be the same as the no motion current field signal stream during portions of the field in which there is no motion and will be the same as the full motion current field signal stream during portions of the field in which there is motion. This is indicated in FIG. 9H. The mixed motion support field signal stream 613 shown in FIG. 9I is analogous to the FIG. 9H situation.

For the line doubler mode, the switch 615, under control of mode controller 607, selects the output of a field merger 619 that includes time compression (see, for example, FIGS. 3A and 3B of said European Patent EP 0 654 197 B1). The field merger 619 assembles the interlaced fields into a progressively scanned signal. As in the 75 Hz mode, when there is no motion in the video input signal, the video processor 609 causes the current field 611 and the support field 613 both to be "direct" fields derived from adjacent fields in the video input signal without interpolation. When there is motion in the video input signal, the video processor 609 causes one of the current field 611 and support field 613 to be a direct field and the other to be derived from an adjacent video input signal field by interpolation. The field merger 619, which includes a one line memory, merges the opposite parity interlaced fields to provide a progressively scanned output signal having a frame rate of nominally 50 Hz with twice the number of lines as in the input video signal.

FIG. 7 provides a further explanation of the line doubler mode operation. FIGS. 7A, 7B and 7C have already been described above. FIG. 7D shows the current field signal stream 611 for the case when the field motion detector in the video processor 609 detects no motion. In this case, the current field signal stream 611 consists of the even and odd fields from each consecutive frame (i.e., AeAoBeBoCeCo, etc.). As indicated in FIGS. 7B and 7C, these fields are available in the signal streams 603 and 605 received by the video processor 609. FIG. 7E shows the support field signal stream 613 for the no motion condition. Each field is the field in the signal stream 603 and 605 that is not selected for the current field 611 (FIG. 7D), which in each case is a field of opposite parity to that of the current field. The support field signal stream 613 also consists of a pattern in which the even and odd fields from each consecutive frame occur once. The first occurring field from a particular frame occurs at substantially the same time in signal stream 605 and the current field signal stream, subject to processing delays in video processor 609.

FIG. 7F shows the current field signal stream 611 for the case when the field motion detector in the video processor 609 detects full motion. In this line doubler mode, unlike the other modes of operation, no interpolated fields are used in the current field signal stream 611, however, the support field signal stream 613 shown in FIG. 7G consists entirely of interpolated fields, each being an interpolation of the corresponding field in the current field signal stream 611. During conditions of mixed motion, the current field signal stream 611 will be the same as the no motion current field signal stream during portions of the field in which there is no motion and will be he same as the full motion current field signal stream during portions of the field in which there is motion. This is indicated in FIG. 7H. The mixed motion support field signal stream 613 shown in FIG. 7I is analogous. The current field 611 and support field 613 are assembled into a progressive scan line doubled television signal in field merger 619.

It would be appreciated by those of ordinary skill in the art that the parity of the various signal streams may be reversed without altering the results obtained by the arrangement of FIG. 7.

Figure 10:
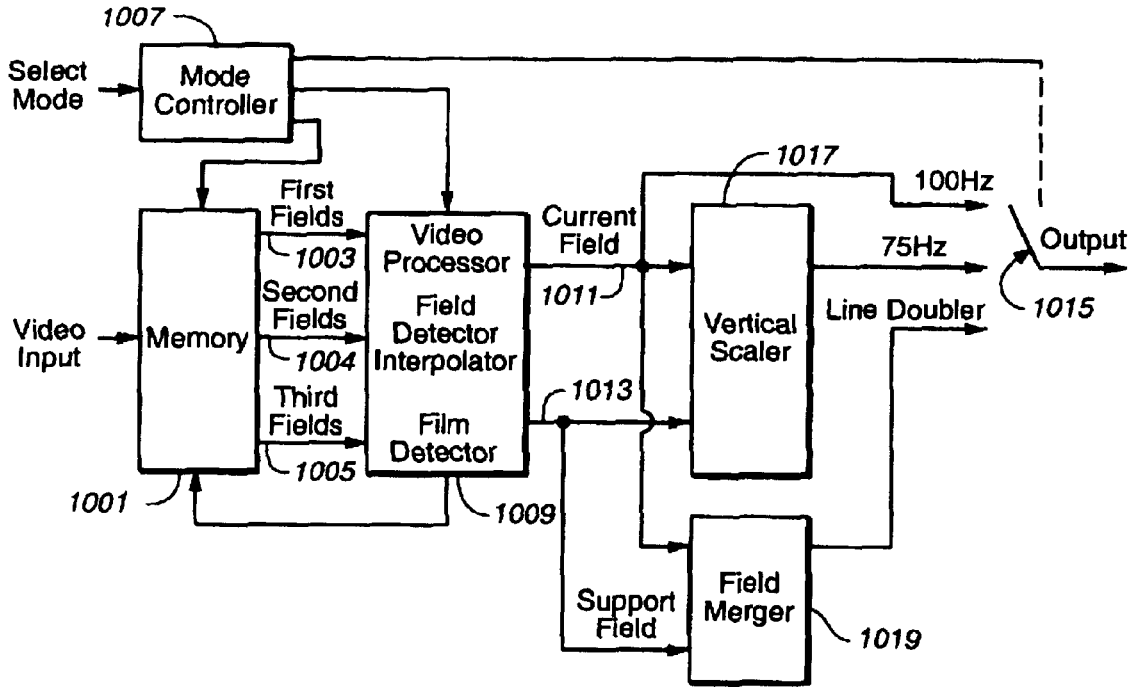
FIG. 10 shows a functional block diagram of an alternative to the embodiment of FIG. 6 in which the arrangement has the ability to recognize and process television signals that are derived from a motion picture film source.

Referring now to FIG. 10, an alternative to the FIG. 6 embodiment of the invention is shown. In this alternative, the multimode arrangement includes the ability to recognize and process television signals that are derived from a motion picture film source. In the case of 50 Hz systems such a 50 Hz PAL and SECAM systems, the frame rate of the motion picture film source is increased from 24 frames/second to 25 frames/second in order to synchronize easily with the television signal's 50 Hz field rate (such that every two adjacent video fields carry the same motion picture film frame). The FIG. 10 arrangement includes the features of the FIG. 6 arrangement, allowing it to operate with input television signals that are derived from motion picture film sources and also those that are not. In other words, the FIG. 10 embodiment merely adds functions to the FIG. 6 embodiment, it does not subtract any functions. The FIG. 10 arrangement retains the advantages of the FIG. 6 arrangement including the requirement for fewer memory resources than required, in the FIG. 3 arrangement. As in the FIG. 6 arrangement, field memories are required only in the input rather than in both the input and the output. The FIG. 10 embodiment may also be embodied as a multimode arrangement and may also be implemented as an ASIC.

As does the FIG. 6 arrangement, the arrangement of FIG. 10 has three modes of operation when a 50 Hz interlaced video input signal (such as a conventional PAL or SECAM television signal) is applied: a conventional line doubler (providing a 50 Hz progressively scanned output with twice the number of scan lines as in the input signal), a 75 Hz interlaced output with more lines than the input signal, and a conventional frame doubler (providing a 100 Hz interlaced output with the same number of lines as in the input signal).

In FIG. 10, the video input is applied first to a memory 1001 that derives three signal streams 1003, 1004 and 1005 from the video input, unlike memory 601 in FIG. 6 that derives only two signal streams from the video input. Signal streams 1003 and 1004 of FIG. 10 have the same characteristics as signal streams 603 and 605, respectively, of FIG. 6. The detection and processing of video sources derived from a motion picture source require the third stream, signal stream 1005. As explained below, under certain conditions, the characteristics of the third signal stream 1005 are changed in response to a signal from the video processor 1009 on line 1010. Memory 1001 includes a random access memory having the capacity to store three fields and switching logic controlled by a mode control signal generated by a mode controller 1007. As in the FIG. 6 arrangement, the mode controller generates control signals in response to a "select mode" input. Switching logic for the field memories in memory 1001 may be implemented in various ways, including, for example, hardwired logic and software controlled processors. The requirements for such logic is discernable from the timing diagrams disclosed herein and are within the ordinary skill in the art.

Signal stream 1003 consists of fields of the same parity, such as all even fields. Signal stream 1004 consists of fields of the opposite parity to those in stream 1003, namely all odd fields if stream 1003 consists of all even fields. Signal stream 1005 consists of fields of the same parity as those in stream 1003 except when a flag signal is present on line 1010 from the video processor 1009, in which case the signal stream characteristics are modified as described below. Fields in all three streams consist of the same field repeated several times, such as two, three times or four times. Each consecutive set of repeated fields in a signal stream is substantially identical in information content to each consecutive field of the same parity in the video input signal.

Figure 11:
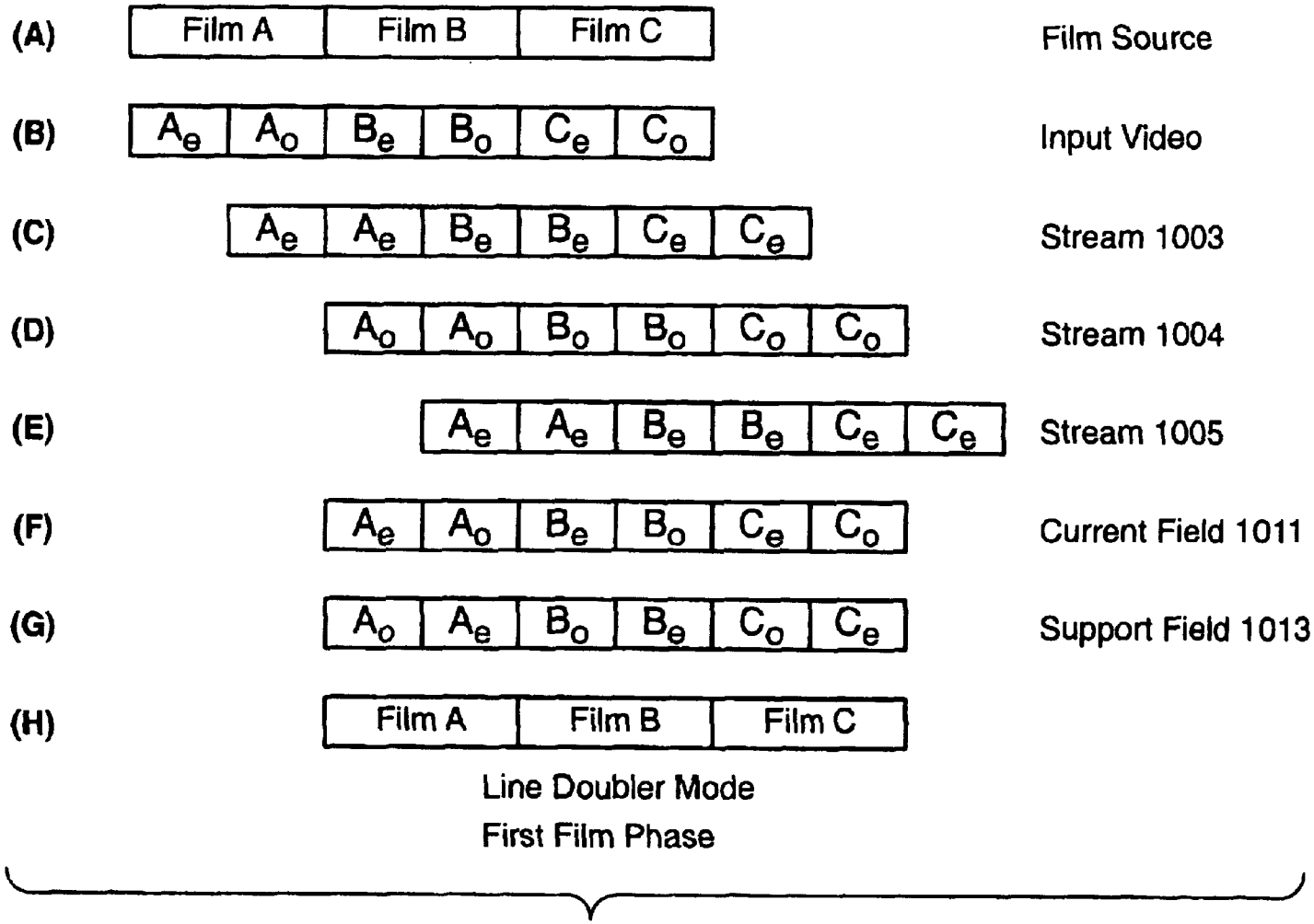
FIGS. 11A through 11H show idealized timing diagrams relating to the line doubler mode of operation of the FIG. 10 arrangement for a first "film phase."
Figure 12:
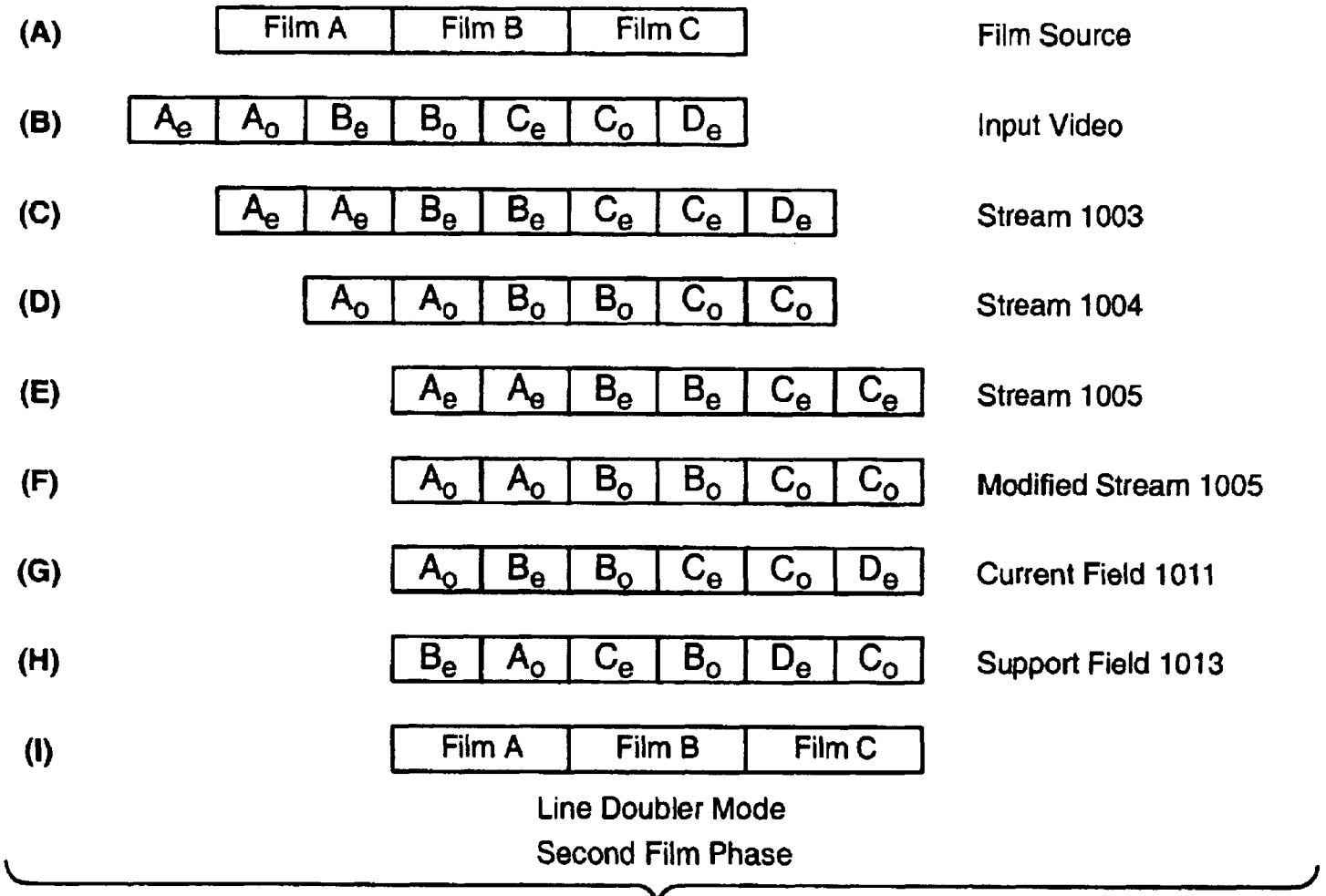
FIGS. 12A through 12I show idealized timing diagrams relating to the line doubler mode of operation of the FIG. 10 arrangement for a second "film phase."

When the mode controller 1007 has its "line doubler" mode selected, memory 1001 operates so that the signal streams 1003 and 1005 both have a field rate of nominally 50 Hz, the same field rate as the video input. FIGS. 11 and 12 show idealized timing diagrams relating to the line doubler mode of operation of the FIG. 10 arrangement. FIG. 11 shows timing diagrams relating to a first "film phase" and FIG. 12 shows timing diagrams relating to a second "film phase." The motion picture film source may have either of two phases with respect to the input television signal—either the video frames are lined up with the film frames such that the odd and even fields of each video frame carry the same film frame or the alignment is such that the odd field of one frame and the even field of the next video frame carry the same film frame. The first case is arbitrarily labeled in the following figures and description as the "first film phase" and the second case as the "second film phase."

FIG. 11A shows three frames of the film source, FIG. 11B shows the input video source and FIGS. 11C, 11D and 11E show the first signal stream 1003, the second signal stream 1004 and the third signal stream, respectively. The input video stream, FIG. 11B, is a conventional interlaced television signal in which Ae, Ao, Be, Bo, etc. represent consecutive alternating even and odd fields at a nominally 50 Hz field rate (i.e., the same as the input video stream of FIGS. 7A, 8A and 9A). As indicated, the film frames and video signal are aligned in a first film phase, as defined above (e.g., fields Ae and Ao carry film frame A). The signal stream 1003 derived by memory 1001 is shown in FIG. 11C. Each even field is repeated twice at the same field rate as the input signal. The signal stream 1004 derived by memory 1001 is shown in FIG. 11D. Each odd field is repeated twice at the same field rate as the input signal. The signal stream 1005 derived from memory 1001 is shown in FIG. 11E. Each even field is repeated twice at the same field rate as the input signal.

The first occurring field from a particular frame is delayed by one 50 Hz field period in signal stream 1004 with respect to signal stream 1003 and by two 50 Hz field periods in signal stream 1005.

FIG. 12A shows three frames of the film source, FIG. 12B shows the input video source (same as in FIG. 11B) and FIGS. 12C, 12D and 12E show the first signal stream 1003, the second signal stream 1004 and the third signal stream, respectively. As indicated, the film frames and video signal are aligned in a second film phase, as defined above (e.g., fields Ao and Be carry film frame A). The signal stream 1003 derived by memory 1001 is shown in FIG. 12C. Each even field is repeated twice at the same field rate as the input signal. The signal stream 1004 derived by memory 1001 is shown in FIG. 12D. Each odd field is repeated twice at the same field rate as the input signal. The signal stream 1005 derived from memory 1001 is shown in FIG. 12E. Each even field is repeated twice at the same field rate as the input signal. The first occurring field from a particular frame is delayed by one 50 Hz field period in signal stream 1004 with respect to signal stream 1003 and by two 50 Hz field periods in modified signal stream 1005.

When the mode control has either its "75 Hz" mode or its "frame doubler" mode selected, memory 1001 operates so that the signal streams 1003, 1004 and 1005 have field rates, respectively, of nominally 75 Hz and nominally 100 Hz, both of which are an increased field rate with respect to the video input. Thus, in the case of the 75 Hz and frame doubler modes, the video input fields are not only separated into even and odd streams and repeated, but also time compressed by memory 1001. This can be accomplished by reading from the memories at a faster rate than writing into them, as is well known in the art.

Figure 13:
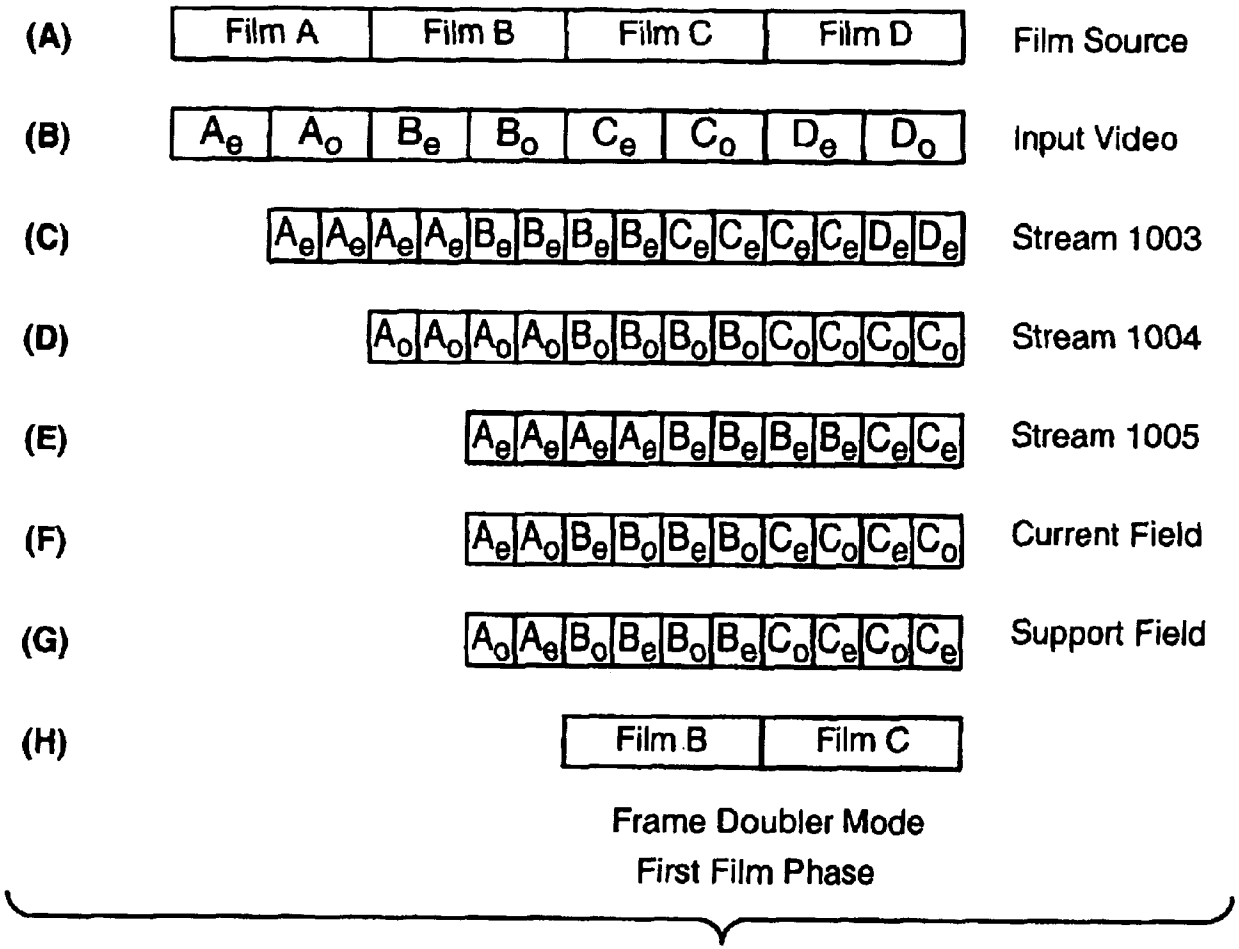
FIGS. 13A through 13H show idealized timing diagrams relating to the frame doubler mode of operation of the FIG. 10 arrangement for a first "film phase."
Figure 14:
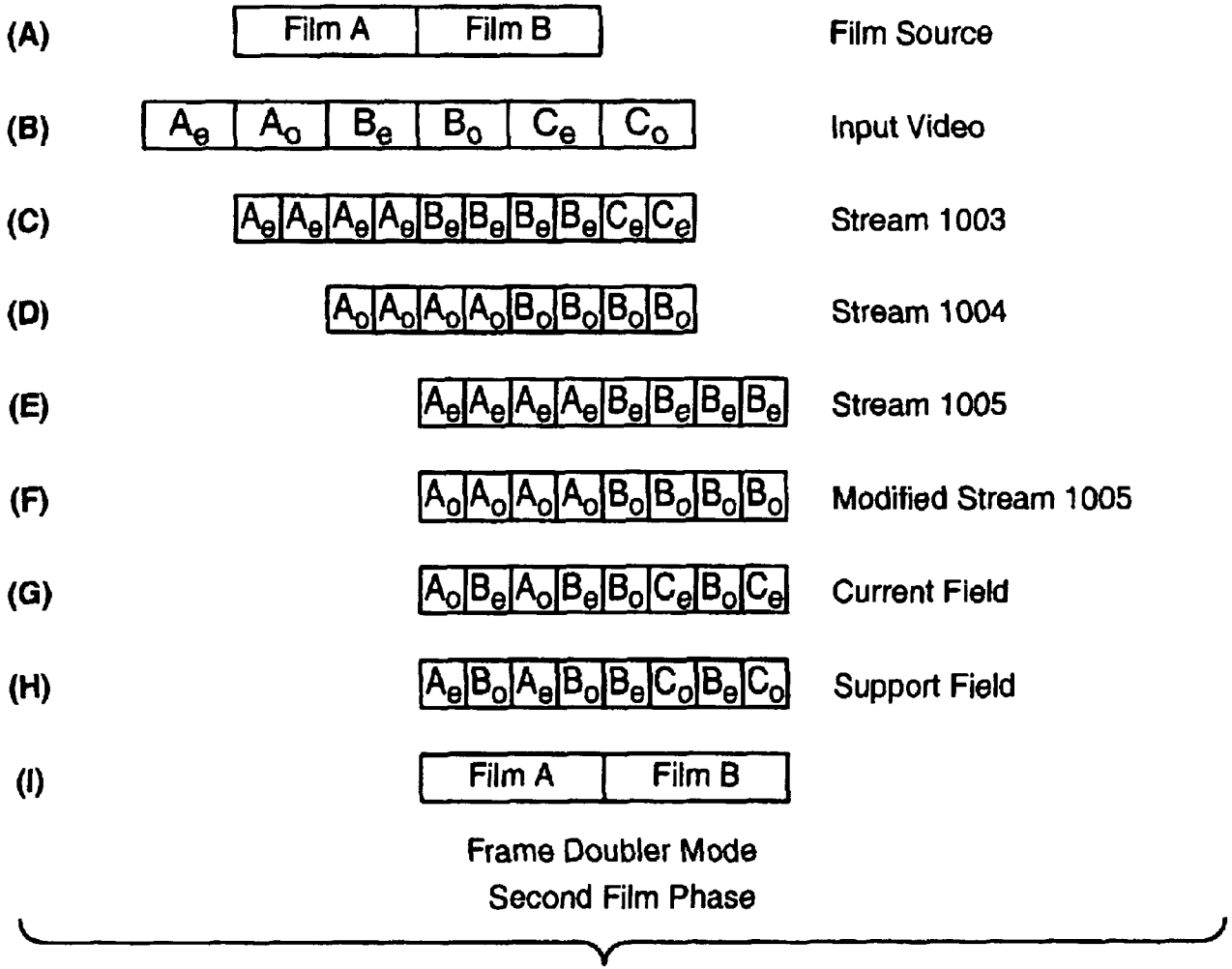
FIGS. 14A through 14I show idealized timing diagrams relating to the frame doubler mode of operation of the FIG. 10 arrangement for a second "film phase."

FIGS. 13 and 14 show idealized timing diagrams relating to the frame doubler mode of operation of the FIG. 10 arrangement. FIG. 13 shows timing diagrams relating to the first "film phase" and FIG. 14 shows timing diagrams relating to the second "film phase."

FIG. 13A shows four frames of the film source, FIG. 13B shows the input video source and FIGS. 13C, 13D and 13E show the first signal stream 1003, the second signal stream 1004 and the third signal stream 1005, respectively. The input video stream, FIG. 13B, is the same as in FIG. 11B. As indicated, the film frames and video signal are aligned in the first film phase, as defined above (e.g., fields Ae and Ao carry film frame A). The signal stream 1003 derived by memory 1001 in the frame doubler mode is shown in FIG. 13C. Each even field is repeated four times at twice the field rate of the input signal. The signal stream 1004 derived by memory 1001 in the frame doubler mode is shown in FIG. 13D. Each odd field is repeated four times at twice the field rate of the input signal. The signal stream 1005 derived by memory 1001 in the frame doubler mode is shown in FIG. 13E. Each even field is repeated four times at twice the field rate of the input signal. The first occurring field from a particular frame is delayed by two 100 Hz field periods in signal stream 1004 with respect to signal stream 1003 and by four 100 Hz field periods in signal stream 1005.

FIG. 14A shows two frames of the film source, FIG. 14B shows the input video source and FIGS. 14C, 14D and 14E show the first signal stream 1003, the second signal stream 1004 and the third signal stream, respectively. The input video stream, FIG. 14B, is the same as in FIG. 11B. As indicated, the film frames and video signal are aligned in the second film phase, as defined above (e.g., fields Ao and Be carry film frame A). The signal stream 1003 derived by memory 1001 in the frame doubler mode is shown in FIG. 14C. Each even field is repeated four times at twice the field rate of the input signal. The signal stream 1004 derived by memory 1001 in the frame doubler mode is shown in FIG. 14D. Each odd field is repeated four times at twice the field rate of the input signal. The signal stream 1005 derived by memory 1001 in the frame doubler mode is shown in FIG. 14E. Each even field is repeated four times at twice the field rate of the input signal. The first occurring field from a particular frame is delayed by two 100 Hz field periods in signal stream 1004 with respect to signal stream 1003 and by four 100 Hz field periods in modified signal stream 1005.

Figure 15:
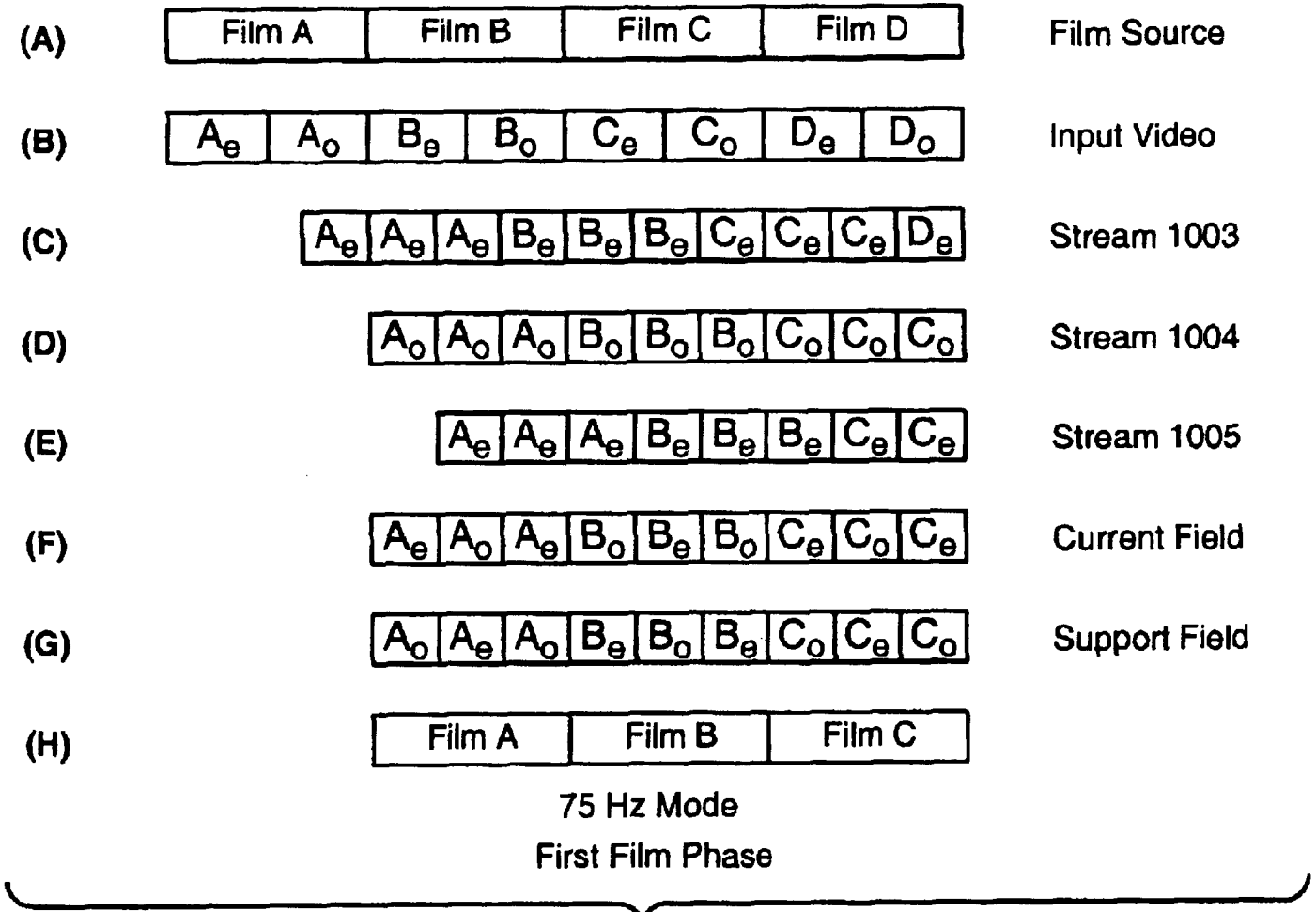
FIGS. 15A through 15H show idealized timing diagrams relating to the 75 Hz mode of operation of the FIG. 10 arrangement for a first "film phase."
Figure 16:
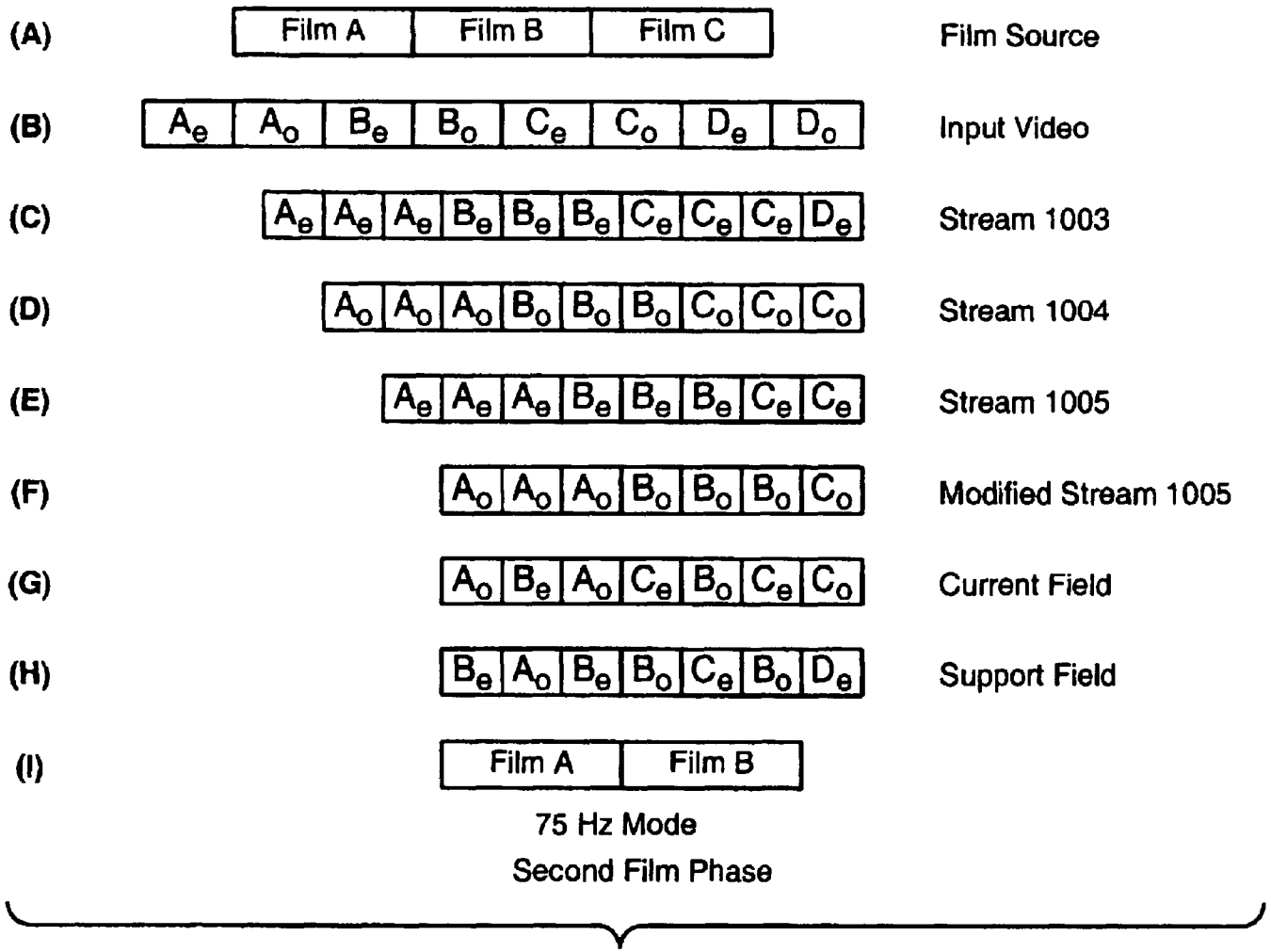
FIGS. 16A through 16I show idealized timing diagrams relating to the 75 Hz mode of operation of the FIG. 10 arrangement for a second "film phase."

FIGS. 15 and 16 show idealized timing diagrams relating to the 75 Hz mode of operation of the FIG. 10 arrangement. FIG. 15 shows timing diagrams relating to the first "film phase" and FIG. 16 shows timing diagrams relating to the second "film phase."

FIG. 15A shows four frames of the film source, FIG. 15B shows the input video source and FIGS. 15C, 15D and 15E show the first signal stream 1003, the second signal stream 1004 and the third signal stream 1005, respectively. The input video stream, FIG. 15B, is the same as in FIG. 11B. As indicated, the film frames and video signal are aligned in the first film phase, as defined above (e.g., fields Ae and Ao carry film frame A). The signal stream 1003 derived by memory 1001 in the 75 Hz mode is shown in FIG. 15C. Each even field is repeated three times at one and a half times the field rate of the input signal. As noted above, repetition of the fields three times at one an a half times the field rate of the input signal results in the dropping of every fourth 75 Hz field in the final output signal. The signal stream 1004 derived by memory 1001 in the frame doubler mode is shown in FIG. 15D. Each odd field is repeated three times at one and a half times the field rate of the input signal. The signal stream 1005 derived by memory 1001 in the frame doubler mode is shown in FIG. 15E. Each even field is repeated three times at one and a half times the field rate of the input signal. The first occurring field from a particular frame is delayed by one 50 field period in signal stream 1004 with respect to signal stream 1003 and by two 50 field periods in signal stream 1005.

FIG. 16A shows three frames of the film source, FIG. 16B shows the input video source and FIGS. 16C, 16D and 16E show the first signal stream 1003, the second signal stream 1004 and the third signal stream, respectively. The input video stream, FIG. 16B, is the same as in FIG. 11B. As indicated, the film frames and video signal are aligned in the second film phase, as defined above (e.g., fields Ao and Be carry film frame A). The signal stream 1003 derived by memory 1001 in the 75 Hz mode is shown in FIG. 16C. Each even field is repeated three times at two and a half times the field rate of the input signal. The signal stream 1004 derived by memory 1001 in the 75 Hz mode is shown in FIG. 16D. Each odd field is repeated three times at two and a half times the field rate of the input signal. The signal stream 1005 derived by memory 1001 in the 75 Hz mode is shown in FIG. 16E. Each even field is repeated three times at two and a half times the field rate of the input signal. The first occurring field from a particular frame is delayed by one 50 field period in signal stream 1004 with respect to signal stream 1003 and by three 50 field periods in modified signal stream 1005.

Returning to the description of FIG. 10, the signal streams 1003 and 1005 are applied to a video processor 1009. Video processor 1009 provides the functions of video processor 609 of FIG. 6 (e.g., it includes a field motion detector and an intra-field interpolator) so that it functions whether or not the source is motion picture film. In addition, video processor 1009 provides additional functions not provided by processor 609 relating to film source detection and processing. Video processor 1009 has two basic modes of operation—a film mode and a video mode. When a film source is detected, the video processor 1009 operates in its film mode and generates outputs in which direct fields derived from the same film frame are grouped together. No motion detection or interpolation is required in the film mode. When a film source is not detected, the video processor 1009 operates in its video mode and generates outputs in which direct and interpolated fields are grouped together so as to minimize undesirable motion artifacts. In addition to its basic film mode and video modes, video processor 1009 also has the three modes of operation present in video processor 609. Thus, the operation of the video processor 1009 also depends on whether the mode controller 1007 has its line doubler, 75 Hz or frame doubler mode selected.

Video processor 1009 detects a film source by comparing pixels in the fields of signal stream 1003 to pixels in the fields of signal stream 1004. Substantially matching pixels generate a "1," else a "0." When a film source is present, repeating patterns of 1s and 0s result. The following film patterns indicate a film source.

Film Source Patterns

| Mode | Compare 1003 to 1004 | Phase |
|---|---|---|
| Line Doubler | 0101 | First |
| Line Doubler | 1010 | Second |
| Frame Doubler | 0011 | First |
| Frame Doubler | 1100 | Second |
| 75 Hz | 001 | First |
| 75 Hz | 101 | Second |

The patterns considered with reference to the frame sync pulse indicate the film phase. When a second film phase is detected, a flag signal is applied by the video processor on line 1010 that causes memory 1001 to modify the characteristics of the third signal stream 1005. The modifications to the third signal stream are explained below.

In the line doubler and 75 Hz modes of operation, the video processor 1009 provides two output signal streams in response to the three input streams 1003, 1004 and 1005. One of its output streams 1011 may be referred to as a "current field" and the other of its output streams 1013 may be referred to as a "support field." Fields in the current field signal stream 1011 and the support field signal stream 1013 are of opposite parity during any given field time. Field periods in the streams 1003 and 1005 are substantially time aligned with each other. Field periods in the streams 1011 and 1013 are substantially time aligned with each other and with the field periods of the fields in streams 1003 and 1005 subject to processing delays in the video processor 1009. In the frame doubler mode of operation, if the number of lines in the output signal are not increased, only the current field signal stream 1011 need be provided by the video processor 1009. If it is desired to increase the number of lines in addition to frame doubling, then it is necessary to generate a support field signal stream in the frame doubler mode and to take the frame doubler output from the scaler 712 rather than directly from the video processor 1009. Frame doubling with a modest increase in the number of lines may still provide a horizontal scan rate supported by inexpensive horizontal scanning circuit components.

In the frame doubler mode in which the number of lines are not increased, an output switch 1015, under control of mode controller 1007, selects the current field signal stream 1011 as the output signal. FIGS. 13 and 14 provide a further explanation of the frame doubler mode operation. FIGS. 13A through 14E have already been described above, as have FIGS. 12A through 12E.

FIGS. 13F and 13G show the current field signal stream 1011 and the support field signal stream for the first film phase in the frame doubler mode. As noted above, there is no interpolation when the video processor 1009 is in its film mode. Thus, the desired current field (FIG. 13F) consists of the video fields grouped in the same way that the film source (FIG. 13A) is related to the input video signal (FIG. 13B). Each field in the support field signal stream (FIG. 13G) is the opposite parity field corresponding to the same film frame. FIG. 13H shows how the current and support field signal streams coordinate as desired with the film source frames. The current field and support field signal streams 1011 and 1013 are then merged by field merger 1019 to produce the desired "line doubled" output, namely a progressively scanned television signal having a 50 Hz frame rate with twice the number of lines as in the video input signal (the same manner in which field merger 619 operates).

FIG. 14 relates to the second film phase for the frame doubler mode. In this case, the relationship of the film source frames to the video fields is offset by one field such that fields Ao and Be correspond to film frame A, etc. See FIGS. 14A and 14B. When the film detector in the video processor 1009 detects the second film phase condition, it causes memory 1001 to modify stream 1005 by reversing the polarity of the fields in stream 1005. See FIG. 14F. Thus, modified stream 1005 is stream 1004 delayed by one field period. The video processor then has the input streams necessary to provide the desired current field (FIG. 14G) in which the video fields are grouped in the same way that the film source (FIG. 14A) is related to the input video signal (FIG. 14B). Each field in the support field signal stream (FIG. 14H) is the opposite parity field corresponding to the same film frame. FIG. 14I shows how the current and support field signal streams coordinate as desired with the film source frames. The current field and support field signal streams 1011 and 1013 are then merged by field merger 1019 to produce the desired "line doubled" output, namely a progressively scanned television signal having a 50 Hz frame rate with twice the number of lines as in the video input signal.

In the 75 Hz mode, the output switch 1015, under control of mode controller 1007, selects the output of vertical scaler 1017. Scaler 1017 receives the current field signal stream 1011 and the support field signal stream 1013 and provides vertical scaling by increasing the number of lines in the television signal by a scale factor. The vertical scaler 1017 increases the line rate of the output video signal with respect to the input video signal by adding selected lines of the support field to the current field, depending on the scale factor.

FIGS. 15 and 16 provide a further explanation of the 75 Hz mode operation. FIGS. 15A through 15E have already been described, as have FIGS. 16A through 16E. FIGS. 15F and 15G show the current field signal stream 1011 and the support field signal stream, respectively, for the first film phase. As noted above, there is no interpolation when the video processor 1009 is in its film mode. Thus, the desired current field (FIG. 15F) consists of the video fields grouped in the same way that the film source (FIG. 15A) is related to the input video signal (FIG. 15B). Each field in the support field signal stream (FIG. 15G) is the opposite parity field corresponding to the same film frame. FIG. 15H shows how the current and support field signal streams coordinate as desired with the film source frames. The current field signal stream 1011 and support field signal stream 1013 are then applied to vertical scaler 1017 that increases the line rate of the output video signal with respect to the input video signal by adding selected lines of the support field to the current field, depending on the scale factor. The fields in the current field stream 1011 and support field stream 1013 are desirable because they are of opposite parity, as is required by the vertical scaler 1017, and are derived from the same film frame.

FIG. 16 relates to the second film phase for the 75 Hz mode. In this case, the relationship of the film source frames to the video fields is offset by one field such that fields Ao and Be correspond to film frame A, etc. See FIGS. 16A and 16B. When the film detector in the video processor 1009 detects the second film phase condition, it causes memory 1001 to modify stream 305 by reversing the polarity of the fields in stream 1005 and delaying the stream by one additional field time. See FIG. 16F. Thus, modified stream 1005 is stream 1004 delayed by two field periods. The video processor then has the input streams necessary to provide the desired current field (FIG. 16G) in which the video fields are grouped in the same way that the film source (FIG. 16A) is related to the input video signal (FIG. 16B). Each field in the support field signal stream (FIG. 16H) is the opposite parity field corresponding to the same film frame. FIG. 16I shows how the current and support field signal streams coordinate as desired with the film source frames. The current field signal stream 1011 and support field signal stream 1013 are then applied to vertical scaler 1017 that increases the line rate of the output video signal with respect to the input video signal by adding selected lines of the support field to the current field, depending on the scale factor.

For the line doubler mode, the switch 1015, under control of mode controller 1007, selects the output of the field merger 1019. FIGS. 11 and 12 provide a further explanation of the line doubler mode operation. FIGS. 11A through 11E have already been described above, as have been FIGS. 12A through 12E. FIG. 11F shows the current field signal stream 1011 for the first film phase. As noted above, there is no interpolation when the video processor 1009 is in its film mode. Thus, the desired current field (FIG. 11F) consists of the video fields grouped in the same way that the film source (FIG. 11A) is related to the input video signal (FIG. 11B). The desired support field signal stream (FIG. 11G) consists of the field having the opposite parity of each field in the current field signal stream. FIG. 11H shows how the current field and support field signal streams coordinate as desired with the film source frames. The signal streams may then be assembled to provide a stream of progressively scanned frames Ae+Ao, Ae+Ao, Be+Bo, Be+Bo, etc.

FIG. 12 relates to the second film phase for the 75 Hz mode. In this case, the relationship of the film source frames to the video fields is offset by one field such that fields Ao and Be correspond to film frame A, etc. See FIGS. 12A and 12B. When the film detector in the video processor 1009 detects the second film phase condition, it causes memory 1001 to modify stream 1005 by reversing the polarity of the fields in stream 1005. See FIG. 12F. Thus, modified stream 1005 is stream 1004 delayed by two field periods. The video processor then has the input streams necessary to provide the desired current field (FIG. 12G) in which the video fields are grouped in the same way that the film source (FIG. 12A) is related to the input video signal (FIG. 12B). The desired support field signal stream (FIG. 12H) consists of the field having the opposite parity in the film pair of each field in the current field signal stream. FIG. 12I shows how the current field and support field signal streams coordinate as desired with the film source frames. The signal streams may then be assembled to provide a stream of progressively scanned frames Ao+Be, Ao+Be, Bo+Ce, Bo+Ce, etc.

It would be appreciated by those of ordinary skill in the art that the parity of the various signal streams may be reversed without altering the results obtained by the arrangement of FIG. 10.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

We claim:

1. A method for deriving an interlaced television signal [from an interlaced 625 line, nominally 50 Hz field rate television signal, the derived television signal] having perceived reduced line structure and perceived reduced flicker, comprising increasing the number of lines in each field of the derived television signal with respect to the number of lines in each field of the original television signal, such that the increase in lines reduces perceived line structure in the derived television signal, said increasing the number of lines comprising de-interlacing the original television signal to produce a progressively scanned [625 line, nominally 50 Hz frame rate] television signal, and increasing the number of lines in each frame of the progressively scanned television signal, and after increasing the number of lines in each field, increasing the field rate of the derived television signal with respect to the field rate of the original television signal, such that the increase in field rate reduces perceived flicker in the derived television signal, said increasing the field rate comprising reinterlacing the progressively scanned television signal such that for some progressively scanned frames a pair of interlaced fields are derived and for selected progressively scanned frames only one interlaced field is derived, whereby selected ones of the potential interlaced fields are dropped, wherein the increase in the field rate and the increase in the number of lines in the derived television signal results in a horizontal scanning rate that does not substantially exceed twice the horizontal scanning rate of the original television signal while minimizing undesirable motion artifacts.

2. A method for deriving an interlaced television signal [from an interlaced 625 line, nominally 50 Hz field rate television signal, the derived television signal] having perceived reduced line structure and perceived reduced flicker, comprising, increasing the number of lines in each field of the derived television signal with respect to the number of lines in each field of the original television signal, such that the increase in lines reduces perceived line structure in the derived television signal, wherein said increasing the number of lines comprises increasing the number of lines in each frame of the original television signal, and de-interlacing the line-increased original television signal to produce a progressively scanned [625 line, nominally 50 Hz frame rate] television signal, and after increasing the number of lines in each field, increasing the field rate of the derived television signal with respect to the field rate of the original television signal, such that the increase in field rate reduces perceived flicker in the derived television signal, wherein said increasing the field rate comprises reinterlacing the progressively scanned television signal such that for some progressively scanned frames a pair of interlaced fields are derived and for selected progressively scanned frames only one interlaced field is derived, whereby selected ones of the potential interlaced fields are dropped, wherein the increase in the field rate and the increase in the number of lines in the derived television signal results in a horizontal scanning rate that does not substantially exceed twice the horizontal scanning rate of the original television signal while minimizing undesirable motion artifacts.

3. The method of claim 1 wherein the *original television signal is an interlaced 625 line, nominally 50 Hz field rate television signal and wherein the* frame rate is increased to nominally 75 Hz and said reinterlacing drops every fourth reinterlaced field.

4. The method of any one of claim 1 [or 2] wherein the frame rate is increased to nominally 75 Hz.

5. The method of claim 4 wherein the line rate is increased to an odd number of lines in the range of 821 to 839 lines.

6. The method of claim 5 wherein the line rate is increased to 825 lines.

7. The method of claim 2 wherein the frame rate is increased to nominally 75 Hz and said reinterlacing drops every fourth reinterlaced field.

8. The method of any one of claim 1 [or 2] wherein the line rate is increased to an odd number of lines in the range of 821 to 839 lines.

9. The method of any one of claim 1 [or 2] wherein the frame rate is increased to nominally 100 Hz.

10. A method for deriving an interlaced television signal [from an interlaced 625 line, nominally 50 Hz field rate television signal, the derived television signal] having perceived reduced line structure and perceived reduced flicker, comprising, in either order, increasing the field rate of the derived television signal with respect to the field rate of the original television signal, such that the increase in field rate reduces perceived flicker in the derived television signal, and increasing the number of lines in each field of the derived television signal with respect to the number of lines in each field of the original television signal, wherein the line rate is increased [to an odd number of lines in the range of 821 to 839 lines,] such that the increase in lines reduces perceived line structure in the derived television signal, wherein the increase in the field rate and the increase in the number of lines in the derived television signal results in a horizontal scanning rate that does not substantially exceed twice the horizontal scanning rate of the original television signal while minimizing undesirable motion artifacts.

11. The method of claim 10 wherein the line rate is increased to 825 lines.

12. A method for deriving an interlaced television signal [from an interlaced 625 line, nominally 50 Hz field rate television signal, the derived television signal] having perceived reduced line structure and perceived reduced flicker, comprising, increasing the field rate of the derived television signal with respect to the field rate of the original television signal, such that the increase in field rate reduces perceived flicker in the derived television signal, said increasing the field rate comprising deriving two or three signal streams from said original television signal, each of said signal streams comprising a pattern of n repeated time-compressed fields, each of said signal streams having a field rate substantially equal to said increased field rate, all of fields in a signal stream being of the same parity, at least one signal stream consisting of even parity fields, each field in a signal stream being substantially identical in information content to each consecutive field of the same parity in the original television signal, deriving a further signal stream from said two or three signal streams by alternately selecting even and odd fields from said two or three signal streams, and deriving yet a further signal stream from said two or three signal streams by alternately selecting, from said two or three signal streams, a field of opposite parity to the field selected for said further signal stream, and after increasing the field rate, increasing the number of lines in each field of the derived television signal with respect to the number of lines in each field of the original television signal, such that the increase in lines reduces perceived line structure in the derived television signal, wherein the increase in the field rate and the increase in the number of lines in the derived television signal results in a horizontal scanning rate that does not substantially exceed twice the horizontal scanning rate of the original television signal while minimizing undesirable motion artifacts.

13. A method for deriving an interlaced television signal [from an interlaced 625 line, nominally 50 Hz field rate television signal, the derived television signal] having perceived reduced line structure and perceived reduced flicker, comprising, increasing the field rate of the derived television signal with respect to the field rate of the original television signal, such that the increase in field rate reduces perceived flicker in the derived television signal, said increasing the field rate comprising deriving two or three signal streams from said original television signal, each of said signal streams comprising a pattern of n repeated time-compressed fields, each of said signal streams having a field rate substantially equal to said increased field rate, all of fields in a signal stream being of the same parity, at least one signal stream consisting of even parity fields, each field in a signal stream being substantially identical in information content to each consecutive field of the same parity in the original television signal, comparing two of said two or three signal streams in order to detect a film pattern, deriving a further signal stream from said two or three signal streams by alternately selecting even and odd fields from said two or three signal streams when a film pattern is detected, and deriving yet a further signal stream from said two or three signal streams by alternately selecting, from said two or three signal streams, a field of opposite parity to the field selected for said further signal stream when a film pattern is detected, and after increasing the field rate, increasing the number of lines in each field of the derived television signal with respect to the number of lines in each field of the original television signal, such that the increase in lines reduces perceived line structure in the derived television signal, wherein the increase in the field rate and the increase in the number of lines in the derived television signal results in a horizontal scanning rate that does not substantially exceed twice the horizontal scanning rate of the original television signal while minimizing undesirable motion artifacts.

14. A method for deriving an interlaced television signal [from an interlaced 625 line, nominally 50 Hz field rate television signal, the derived television signal] having perceived reduced line structure and perceived reduced flicker, comprising, increasing the field rate of the derived television signal with respect to the field rate of the original television signal, such that the increase in field rate reduces perceived flicker in the derived television signal, said increasing the field rate comprising deriving two or three signal streams from said original television signal, each of said signal streams comprising a pattern of n repeated time-compressed fields, each of said signal streams having a field rate substantially equal to said increased field rate, all of fields in a signal stream being of the same parity, at least one signal stream consisting of even parity fields, each field in a signal stream being substantially identical in information content to each consecutive field of the same parity in the original television signal, comparing adjacent fields in one of said two or three signal streams in order to detect motion, generating even and odd interpolated fields from fields in said two or three signal streams, deriving a further signal stream from said two or three signal streams and said interpolated fields by alternately selecting even and odd fields from among said two or three signal streams and interpolated fields when motion is detected, and deriving yet a further signal stream from said two or three signal streams and interpolated fields by alternately selecting, from said two or three signal streams and said interpolated fields, a field of opposite parity to the field selected for said further signal stream when motion is detected, and after increasing the field rate, increasing the number of lines in each field of the derived television signal with respect to the number of lines in each field of the original television signal, such that the increase in lines reduces perceived line structure in the derived television signal, wherein the increase in the field rate and the increase in the number of lines in the derived television signal results in a horizontal scanning rate that does not substantially exceed twice the horizontal scanning rate of the original television signal while minimizing undesirable motion *artifacts*.

15. The method of any one of claim 12, [13, or 14] wherein said increasing the number of lines in each field of the derived television signal with respect to the number of lines in each field of the original television signal comprises:

combining said further signal stream with portions of said yet further signal stream.

16. The method of any one of claim 12, [13, or 14] wherein n is three and the field rate is increased to nominally 75 Hz.

17. The method of claim 16 wherein the line rate is increased to an odd number of lines in the range of 821 to 839 lines.

18. The method of claim 17 wherein the line rate is increased to 825 lines.

19. The method of any one of claim 12, [13, or 14] wherein the line rate is increased to an odd number of lines in the range of 821 to 839 lines.

20. The method of claim 19 wherein the line rate is increased to 825 lines.

21. The method of any one of claim 12, [13, or 14] wherein n is four and the field rate is increased to nominally 100 Hz.

* * * * *